US012236016B2

(12) United States Patent
Hirai

(10) Patent No.: US 12,236,016 B2
(45) Date of Patent: Feb. 25, 2025

(54) CONTROL APPARATUS AND CONTROL METHOD

(71) Applicant: Panasonic Intellectual Property Management Co., Ltd., Osaka (JP)

(72) Inventor: Atsushi Hirai, Tokyo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/385,741

(22) Filed: Oct. 31, 2023

(65) Prior Publication Data
US 2024/0143084 A1 May 2, 2024

(30) Foreign Application Priority Data
Nov. 1, 2022 (JP) ................... 2022-175603

(51) Int. Cl.
*G06F 3/01* (2006.01)
(52) U.S. Cl.
CPC .................... *G06F 3/017* (2013.01)
(58) Field of Classification Search
CPC . G06F 3/017; G06F 3/01; G06F 3/011; G06F 3/0304; G06F 3/04845; G06F 3/04815; G06F 3/04842
See application file for complete search history.

(56) References Cited

U.S. PATENT DOCUMENTS

| | | | |
|---|---|---|---|
| 9,256,288 B2 | 2/2016 | Lee et al. | |
| 9,948,871 B2 * | 4/2018 | Wayama | H04N 5/32 |
| 10,318,015 B2 * | 6/2019 | Goto | G06F 3/0346 |
| 11,386,576 B2 * | 7/2022 | Magai | G06T 7/20 |
| 11,726,575 B2 * | 8/2023 | Cohen | G06F 3/017 345/158 |
| 2007/0171202 A1 * | 7/2007 | Yang | G06F 3/0346 345/158 |
| 2010/0103096 A1 * | 4/2010 | Yamamoto | G06F 3/0346 345/157 |
| 2012/0131518 A1 * | 5/2012 | Lee | G06F 3/0346 715/863 |

(Continued)

FOREIGN PATENT DOCUMENTS

| | | |
|---|---|---|
| JP | 2012-113715 | 6/2012 |
| JP | 2013-242889 | 12/2013 |

(Continued)

*Primary Examiner* — Olga V Merkoulova
(74) *Attorney, Agent, or Firm* — Greenblum & Bernstein, P.L.C.

(57) ABSTRACT

A coordinate reception unit receives time series spatial coordinates of an object to be detected. The spatial coordinates include a coordinate in a first direction, a coordinate in a second direction intersecting the first direction, and a coordinate in a third direction intersecting the first direction and the second direction. When a predetermined first condition related to a change in the coordinate in the first direction is satisfied at a first point of time and then a predetermined second condition related to a change in the coordinate in the first direction is satisfied at a second point of time, a function execution unit executes a process in electronic equipment that is a target of control, based on the coordinate in the second direction and the coordinate in the third direction at one or more points of time between the first point of time and the second point of time.

18 Claims, 14 Drawing Sheets

(56) References Cited

U.S. PATENT DOCUMENTS

| | | | | |
|---|---|---|---|---|
| 2012/0179408 A1* | 7/2012 | Goto | ............... | G06F 3/0346 |
| | | | | 702/104 |
| 2013/0241819 A1 | 9/2013 | Yamashita | | |
| 2016/0025865 A1* | 1/2016 | Wayama | ............ | H04N 5/32 |
| | | | | 250/370.07 |
| 2021/0035327 A1* | 2/2021 | Magai | ............ | G06T 7/90 |
| 2021/0342013 A1* | 11/2021 | Cohen | ............ | G06F 3/017 |
| 2024/0241593 A1* | 7/2024 | Yoshida | ............ | G06F 3/0416 |

FOREIGN PATENT DOCUMENTS

| | | |
|---|---|---|
| JP | 2019-021338 | 2/2019 |
| WO | 2013/137412 | 9/2013 |
| WO | 2015/030264 | 3/2015 |

\* cited by examiner

CONTROL APPARATUS AND CONTROL METHOD

BACKGROUND

1. Field

The present disclosure relates to control apparatuses and control methods.

2. Description of the Related Art

Information processing apparatuses in which the user inputs instructions by gestures are known (see, for example, patent literature 1). In these information processing apparatuses, a coordinate calculation means calculates coordinates in at least one location of an object to be detected. A control means causes a display means to display that at least one item, of a plurality of items for which a predetermined sequence is defined, is selected and changes the selected item according to the predetermined sequence based on a change in the coordinates. When the change in the coordinates satisfies a predetermined condition, the control means executes a process corresponding to the selected item.
[Patent Literature 1] JP 2019-21338

SUMMARY

Further improvement is called for in a control apparatus that receives control inputs by the user.

A control apparatus according to an embodiment of the present disclosure includes: a coordinate reception unit that receives time series spatial coordinates of an object to be detected, the spatial coordinates including a coordinate in a first direction, a coordinate in a second direction intersecting the first direction, and a coordinate in a third direction intersecting the first direction and the second direction; and a function execution unit that, when a predetermined first condition related to a change in the coordinate in the first direction is satisfied at a first point of time and then a predetermined second condition related to a change in the coordinate in the first direction is satisfied at a second point of time, executes a process in electronic equipment that is a target of control, based on the coordinate in the second direction and the coordinate in the third direction at one or more points of time between the first point of time and the second point of time.

Another embodiment of the present disclosure relates to a control method. The method includes: receiving time series spatial coordinates of an object to be detected, the spatial coordinates including a coordinate in a first direction, a coordinate in a second direction intersecting the first direction, and a coordinate in a third direction intersecting the first direction and the second direction; and, when a predetermined first condition related to a change in the coordinate in the first direction is satisfied at a first point of time and then a predetermined second condition related to a change in the coordinate in the first direction is satisfied at a second point of time, executing a process in electronic equipment that is a target of control, based on the coordinate in the second direction and the coordinate in the third direction at one or more points of time between the first point of time and the second point of time.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Figure 1:
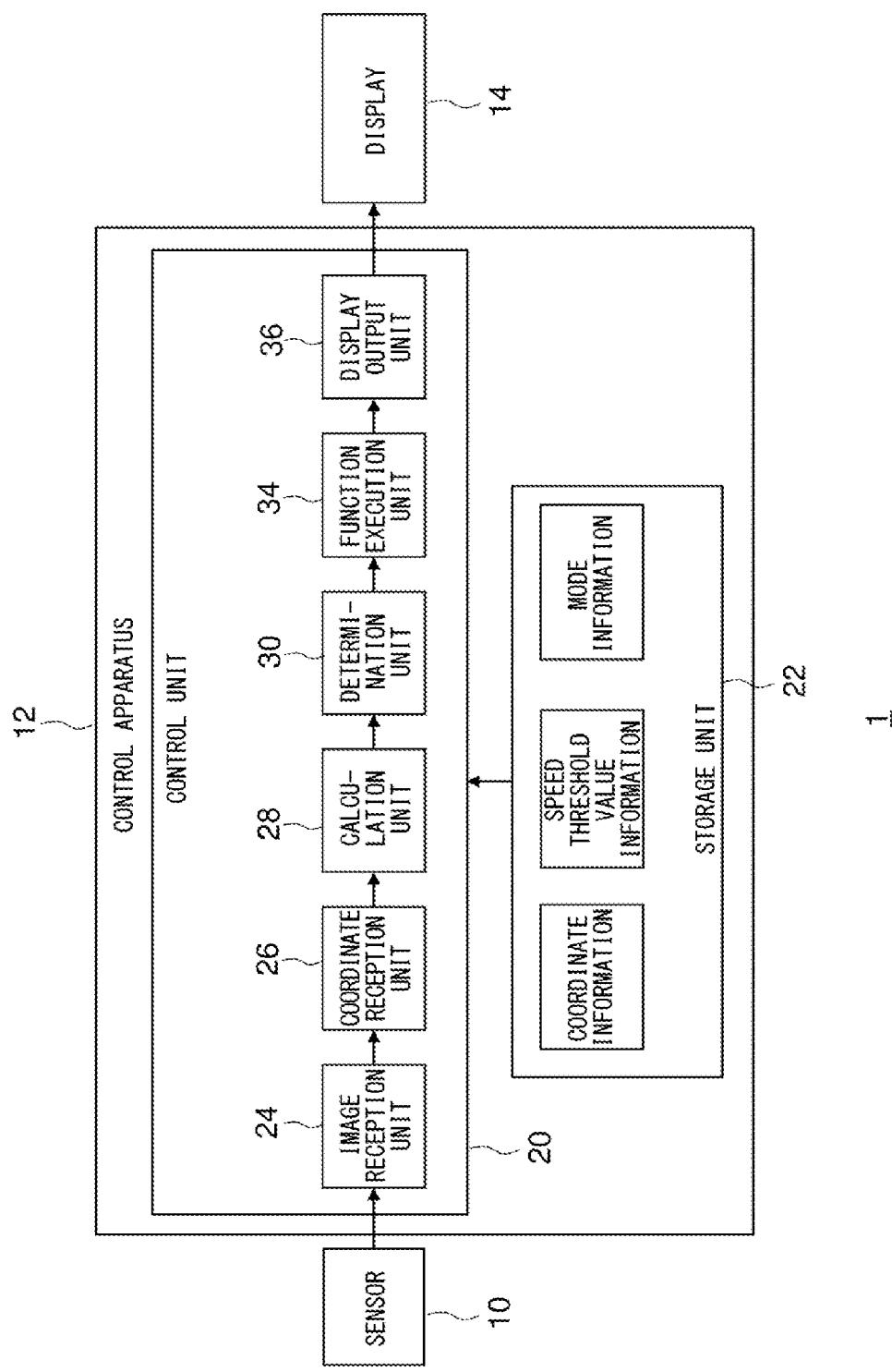
FIG. 1 is a block diagram of an information processing system of the first embodiment.

The invention will now be described by reference to the preferred embodiments. This does not intend to limit the scope of the present invention, but to exemplify the invention.

Hereinafter, identical or like constituting elements, members, steps shown in the drawings are represented by identical symbols, and a duplicate description will be omitted as appropriate. The dimension of members in the drawings shall be enlarged or reduced as appropriate to facilitate understanding.

First Embodiment

FIG. 1 is a block diagram of an information processing system 1 of the first embodiment. The information processing system 1 includes a sensor 10, a control apparatus 12, and a display 14.

The information processing system 1 may be installed indoors, etc. or may be mounted on a vehicle such as a car, and the application thereof is not particularly limited. By moving the fingertip of the hand in the air without touching the display 14, the user can input a user control corresponding to the movement to the control apparatus 12, and the control apparatus 12 executes a process corresponding to the input user control. The action of the user moving the fingertip in the air can be called an aerial touch action or a gesture action. In this embodiment, a process for detecting an action of the user pushing the fingertip toward the display surface of the display 14 in the air will be mainly described. This action can also be called an aerial push action or an aerial click action.

The sensor 10 is, for example, a depth camera and is installed at a position where the user located in front of a display surface 15 of the display 14 can be imaged. The sensor 10 periodically images the user and outputs time-series range images thus captured to the control apparatus 12. The frequency of imaging can be appropriately determined by experiments or simulations. For example, images may be captured multiple times per second. The range image includes information on spatial coordinates of each position in the image. These spatial coordinates are coordinates in a three-dimensional Cartesian coordinate system unique to the sensor 10.

The control apparatus 12 recognizes the movement of the user's fingertip based on time-series range images supplied from the sensor 10, receives a control input corresponding to the movement of the fingertip, and executes a process corresponding to the control. The process corresponding to the control includes a process in the display 14 that is a target of control. The target of control is not limited to the display 14 but may be other electronic equipment such as, for example, a lighting device and a speaker.

The fingertip is an example of an object to be detected used for control inputs, and the object to be detected is not limited to the fingertip. Another example of an object to be detected is a clenched fist or a palm that is a part of the user's body. The object to be detected is not limited to a part of the user's body but may be an object held in the user's hand or an object worn on the user's body.

The display 14 displays an image according to the control by the control apparatus 12. The display 14 may have, for example, a screen size of several tens of inches or more for indoor installation or a smaller screen size for in-vehicle use.

Figure 2:
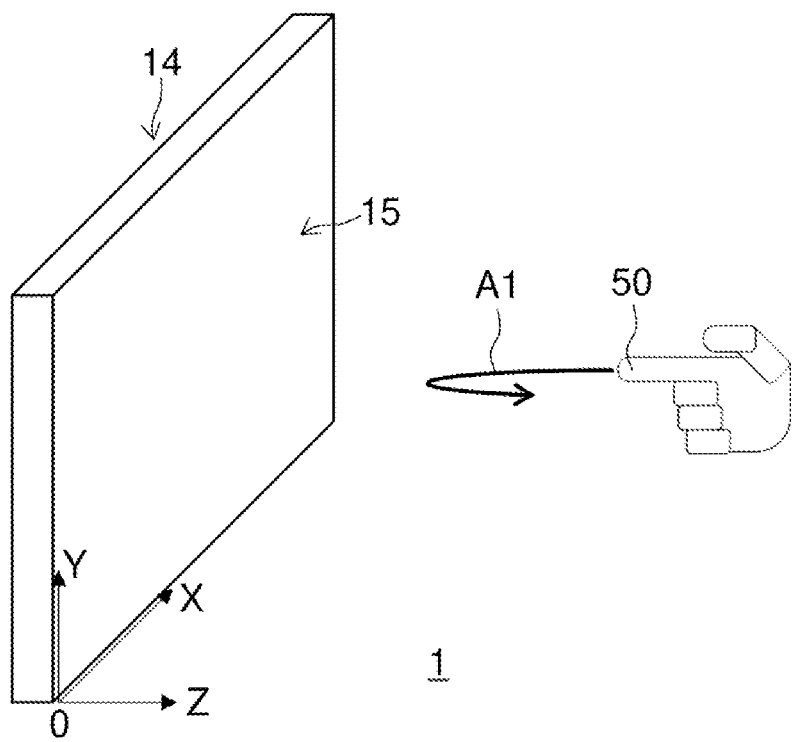
FIG. 2 is a perspective view illustrating an aerial push action.

FIG. 2 is a perspective view illustrating an aerial push action. In FIG. 2, the illustration of the sensor 10 and the control apparatus 12 is omitted. As shown in FIG. 2, the information processing system 1 defines the X axis, the Y axis, and the Z axis of a three-dimensional Cartesian coordinate system. The Z axis extends in the first direction. The first direction can also be called the Z direction. In the illustrated example, the first direction is the normal direction of the display surface 15 of the display 14. Coordinates in the first direction are defined as Z coordinates. For example, the Z coordinate on the display surface 15 is 0, and the more distanced from the display surface 15, the larger the Z coordinate. The X axis extends in the second direction orthogonal to the first direction. The second direction can also be called the X direction. Coordinates in the second direction are defined as X coordinates. The Y axis extends in the third direction orthogonal to the first direction and the second direction. The third direction can also be called the Y direction. Coordinates in the third direction are defined as Y coordinates. The X axis and the Y axis extend, for example, within the display surface 15.

As shown in FIG. 2, when the user performs an aerial push action along the arrow A1 of bringing a fingertip 50 closer to the display surface 15 and then moving it away, the control apparatus 12 detects this action.

Figure 3:
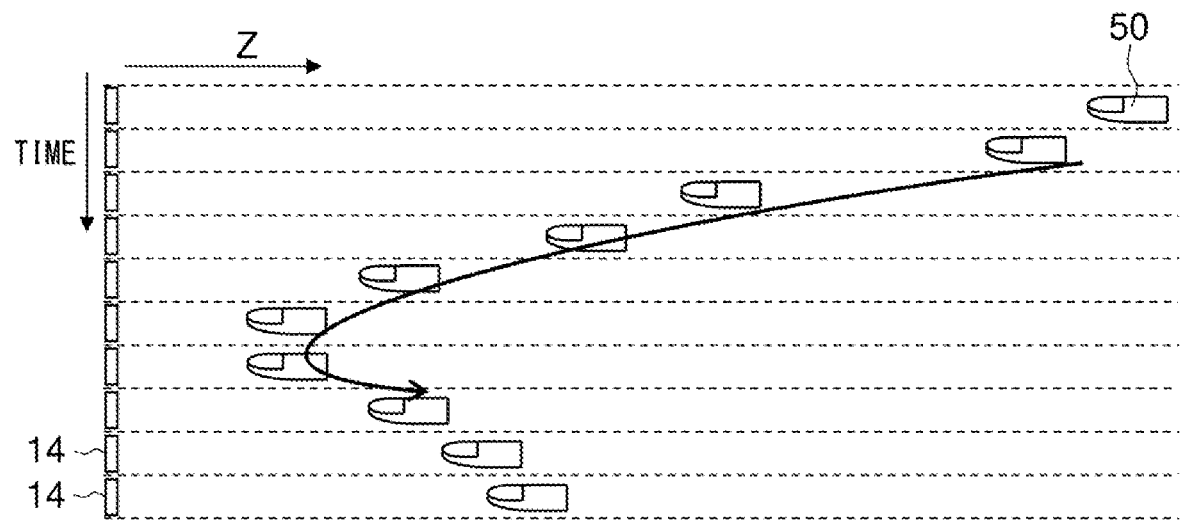
FIG. 3 shows an example of the relationship between the position of the fingertip and the time during an aerial push action.

FIG. 3 shows an example of the relationship between the position of the fingertip 50 and the time during an aerial push action. FIG. 3 shows positions of the fingertip 50 at equal time intervals. It is assumed that the speed of the fingertip 50 in the Z direction occurring when the Z coordinate of the fingertip 50 becomes smaller has a negative value. When the speed of the fingertip 50 in the Z direction has a negative value, the speed of the fingertip 50 in the Z direction is defined to be a negative speed (speed in the negative direction). As a result of analyzing the change in the coordinate of the fingertip 50 during an aerial push action, we have found that, as shown in FIG. 3, the absolute value of the speed of the fingertip 50 in the Z direction increases and then decreases as the fingertip 50 approaches the display 14, that the fingertip 50 then comes to a halt, and that the fingertip 50 then returns in the reverse direction. Such an action of the fingertip 50 can also be called a rebound action of the push action.

When the speed of the fingertip 50 in the Z direction is a negative speed and the absolute value of the speed in the Z direction becomes equal to or greater than the first speed threshold value that is a predetermined positive value and then the speed in the Z direction is inverted from a negative speed to a positive speed (speed in the positive direction), therefore, the control apparatus 12 identifies the X coordinate and the Y coordinate of the fingertip 50 occurring when the speed in the Z direction is inverted from a negative speed to a positive speed and executes a process corresponding to the push action based on the identified X coordinate and the Y coordinate. The process corresponding to the push action may include, for example, displaying, at the position on the screen of the display 14 defined by the X coordinate and the Y coordinate thus identified, an image indicating that the position has been clicked, i.e., the position has been determined.

When a plurality of items such as control buttons are displayed on the display 14, for example, the control apparatus 12 does not highlight an item, of the plurality of items, located in the direction that the fingertip 50 faces, before detecting a push action. That is, the control apparatus 12 does not cause the display 14 to display an image that makes it possible to identify a selected item corresponding to the position of the fingertip 50, before detecting a push action.

Therefore, this can let the user intuitively perform an action for determining the X coordinate and the Y coordinate of the fingertip 50 in a relatively short time without visually confirming that the desired position is selected.

A detection apparatus that highlights the selected item corresponding to the fingertip on the display before detecting a predetermined action for determination will be discussed as a comparative example. In this comparison example, the selected item of a plurality of items can be changed according to the position of the fingertip. The user moves the fingertip up, down, left, and right in front of the display and performs a predetermined action for determination with the fingertip while the desired item is highlighted as the selected item. The detection apparatus determines the item selected when the detection apparatus detects that the action for determination has been completed and executes a process corresponding to the determined item. In the comparison example, the user visually confirms that the desired item is selected before performing an action for determination so that intuitiveness may be impaired. An action for determination in the comparative example is exemplified by a particular gesture action such as an action to stop the fingertip for a certain period of time or drawing a circle with the fingertip. Alternatively, an action to pull the fingertip toward the user for a certain distance may be performed. The time elapsed until the detection apparatus of the comparative example detects that these actions for determination have been completed is relatively long.

According to this embodiment, these problems of the comparative example can be solved as described above. When the user repeats aerial push actions in succession at different positions, for example, the control apparatus 12 can receive a plurality of user controls in a shorter time than in the comparative example.

Hereinafter, the operation of the control apparatus 12 will be described in further detail. As shown in FIG. 1, the control apparatus 12 includes a control unit 20 and a storage unit 22. The control unit 20 includes an image reception unit 24, a coordinate reception unit 26, a calculation unit 28, a determination unit 30, a function execution unit 34, and a display output unit 36.

The features of the control unit 20 are implemented in hardware such as a CPU, a memory, and other LSIs of any computer and in software such as a program loaded into a memory. The figure depicts functional blocks implemented by the cooperation of these elements. Therefore, it will be understood by those skilled in the art that these functional blocks may be implemented in a variety of manners by hardware only, software only, or by a combination of hardware and software. The control apparatus 12 includes, for example, a processor and a memory, and the processor executes a program loaded into the memory, thereby realizing the functions of the control unit 20 and the respective function blocks that the control unit 20 has.

The storage unit 22 stores various information. The storage unit 22 is realized by hardware for storing information (in other words, data) such as a memory or a storage. The storage unit 22 maintains coordinate information, speed threshold information, and mode information. The coordinate information includes the spatial coordinates of the installation position of the sensor 10, the mounting angle of the sensor 10, and the spatial coordinates of the installation position of the display 14. The speed threshold information includes information on the first speed threshold value and the second speed threshold value. Details of coordinate information, speed threshold information, and mode information will be described later.

The image reception unit 24 receives time-series range images of the user located in front of the display 14 from the sensor 10 and detects the user's fingertip 50 by recognizing each range image received. Known image recognition technology can be used to detect the fingertip 50. The image reception unit 24 acquires the spatial coordinates of the detected fingertip 50 on a time series basis.

The image reception unit 24 calculates the time series spatial coordinates of the user's fingertip 50 in the three-dimensional Cartesian coordinate system of the information processing system 1, based on the acquired spatial coordinates of the user's fingertip 50 in the coordinate system of the sensor 10, the spatial coordinates of the installation position of the sensor 10 and the mounting angle of the sensor 10 included in the coordinate information stored in the storage unit 22. The image reception unit 24 supplies the calculated spatial coordinates to the coordinate reception unit 26. The coordinate reception unit 26 receives the spatial coordinates from the image reception unit 24 and outputs the received spatial coordinates to the calculation unit 28.

The calculation unit 28 calculates the Z direction speed of the fingertip 50 on a time series basis, based on the spatial coordinates supplied from the coordinate reception unit 26, and supplies the calculated Z direction speed to the determination unit 30.

Based on the speed threshold information stored in the storage unit 22, the determination unit 30 determines the relative magnitude of the Z direction speed supplied from the calculation unit 28, the first speed threshold value, and the second speed threshold value. The determination unit 30 determines whether a predetermined first condition, which requires that the Z direction speed of the fingertip 50 is a negative speed and that the absolute value of the Z direction speed is equal to or greater than the first speed threshold value, is satisfied. When the first condition is satisfied, the determination unit 30 transitions to the click mode. The click mode is an action receiving mode for receiving an aerial push action.

In the click mode, the determination unit 30 determines whether a predetermined second condition, which requires that the Z direction speed is a positive speed and is equal to or greater than the second speed threshold value, is satisfied. The second speed threshold value is a positive value slightly greater than zero. The second speed threshold value may be determined to make it possible to accurately determine the point of time when the Z direction speed is inverted from a negative speed to a positive speed. That is, the second condition may require that the Z direction speed is a positive speed.

The first condition and the second condition are conditions related to the change in the coordinates of the fingertip 50 in the Z direction, respectively. The first speed threshold value and the second speed threshold value can be appropriately determined by experiments or simulations. The first speed threshold value and the second speed threshold value may be set by the user. The determination unit 30 supplies the determination result to the function execution unit 34.

When the determination unit 30 determines that the first condition is satisfied at the first point of time and the second condition is satisfied at the second point of time later than the first point of time, the function execution unit 34 executes the process in the display 14 based on the X coordinate and the Y coordinate of the fingertip 50 at the second point of time. The mode information maintained in the storage unit 22 includes information related to the detail of the process that should be executed when the second condition is satisfied in the click mode. For example, the function execution unit 34 generates, based on the mode information maintained in the storage unit 22, image data in which the process corresponding to the X coordinate and the Y coordinate thus determined and to the push action is executed, and supplies the image data to the display output unit 36.

The function execution unit 34 may execute the process based on the X coordinate and the Y coordinate of the fingertip 50 at a point of time between the first point of time and the second point of time instead of based on the X coordinate and the Y coordinate of the fingertip 50 at the second point of time.

The display output unit 36 outputs the image data supplied from the function execution unit 34 to the display 14 and causes the display 14 to display the image.

Figure 4:
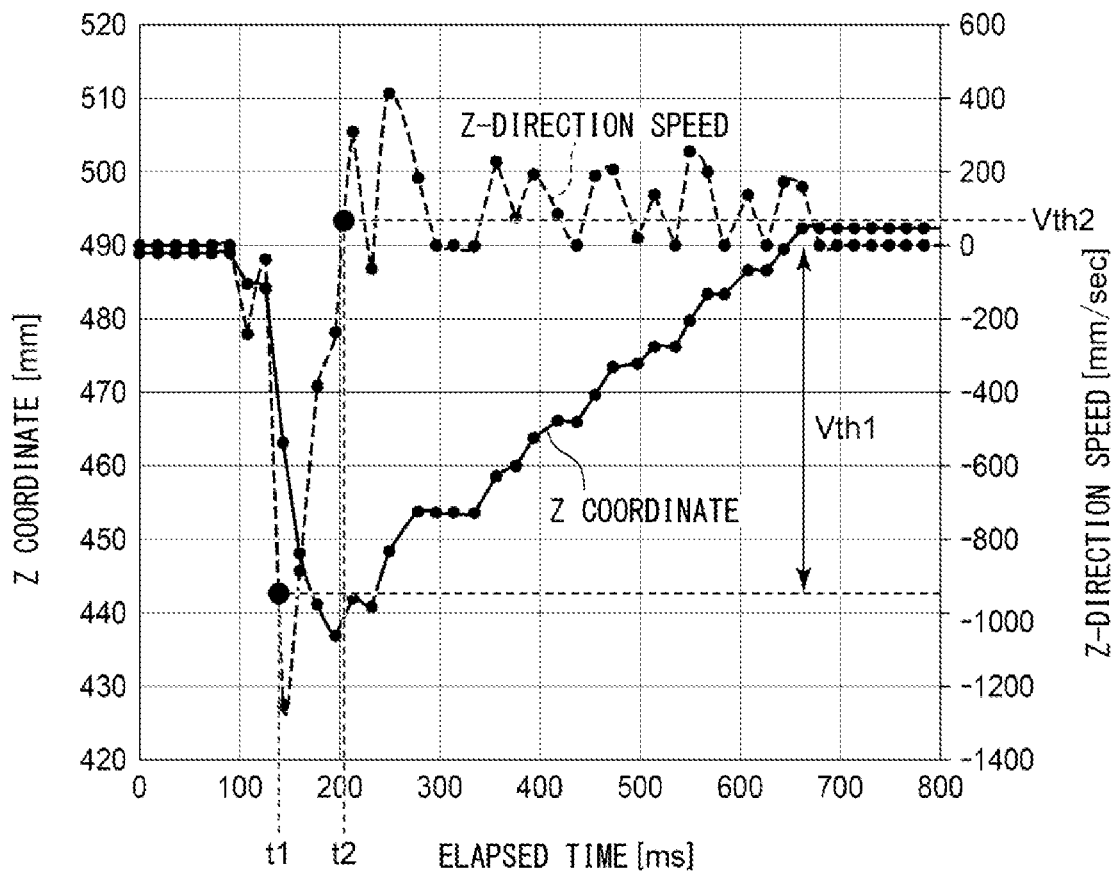
FIG. 4 is a diagram for explaining the process in the control apparatus of FIG. 1 during an aerial push action.

FIG. 4 is a diagram for explaining the process in the control apparatus 12 of FIG. 1 during an aerial push action. The horizontal axis of FIG. 4 represents the time elapsed since time 0, and the vertical axis represents the Z coordinate and the Z direction speed. In FIG. 4, the solid line indicates the change in the Z coordinate of the fingertip 50 corresponding to the elapsed time, and the dashed line indicates the change in the Z direction speed at that time.

The fingertip 50 starts moving toward the display surface of the display 14, the Z direction speed becomes a negative speed, and the absolute value of the Z direction speed becomes equal to the first speed threshold value Vth1 at the first point of time t1. Subsequently, the fingertip 50 stops, moves away from the display surface, the Z direction speed becomes a positive speed, and the Z direction speed becomes equal to the second speed threshold value Vth2 at the second point of time t2. The function execution unit 34 identifies the X coordinate and the Y coordinate of the fingertip 50 at the second point of time t2 and executes a process in the display 14.

Figure 5:
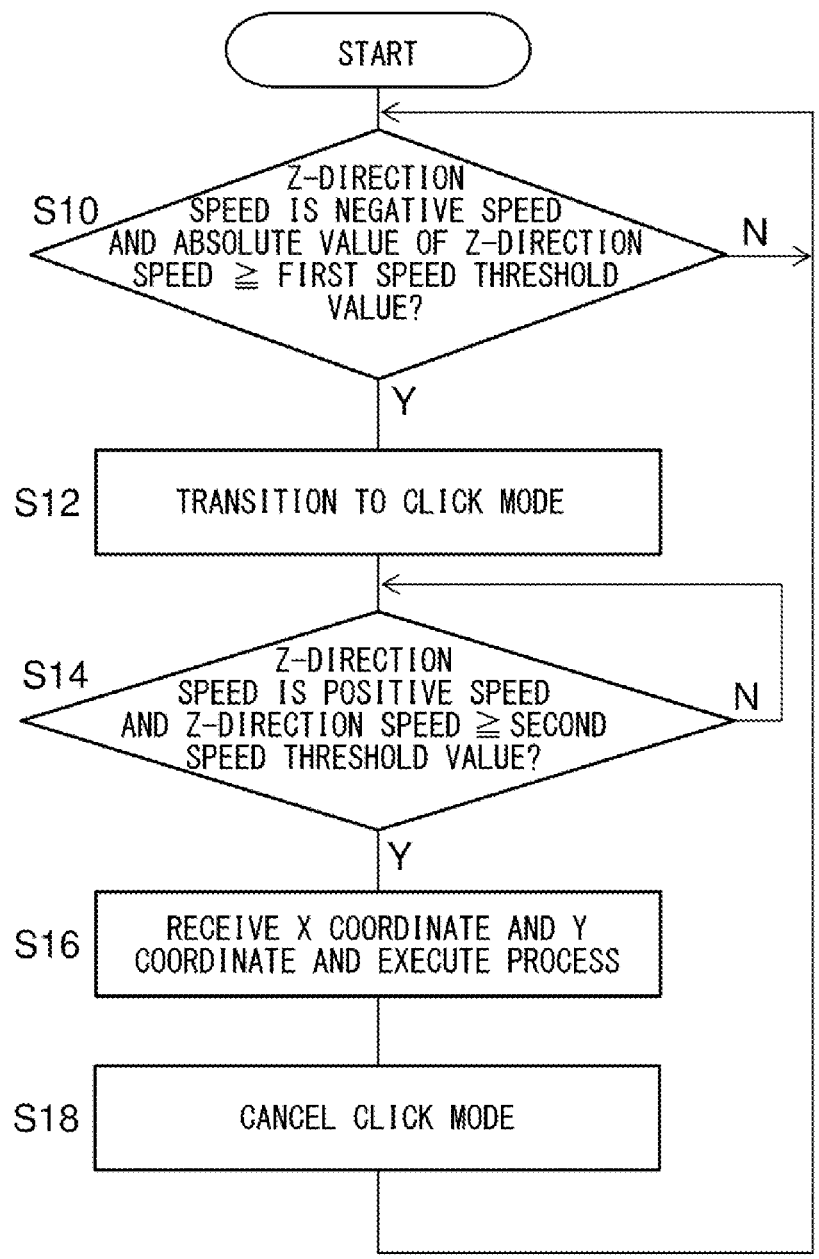
FIG. 5 is a flowchart showing the process in the information processing system of FIG. 1.

A description will now be given of the overall operation of the information processing system 1 having the above configuration. FIG. 5 is a flowchart showing the process in the information processing system 1 of FIG. 1. The determination unit 30 determines whether the Z direction speed is a negative speed and the absolute value of the Z direction speed is equal to or greater than the first speed threshold value Vth1 (S10). When this condition is not satisfied (N in S10), the determination unit 30 returns to process of S10. When the Z direction speed is a negative speed and the absolute value of the Z direction speed is equal to or greater than the first speed threshold value Vth1 (Y in S10), the determination unit 30 transitions to the click mode (S12). The determination unit 30 determines whether the Z direction speed is a positive speed and is equal to or greater than the second speed threshold value Vth2 (S14). When this condition is not satisfied (N in S14), the determination unit 30 returns to process of S14. When the Z direction speed is a positive speed and is equal to or greater than the second speed threshold Vth2 value (Y in S14), the function execution unit 34 receives the X coordinate and the Y coordinate of the fingertip 50 occurring when it is determined that the Z direction speed is a positive speed and is equal to or greater than the second speed threshold value Vth2 and executes the process (S16). The determination unit 30 cancels the click mode (S18) and returns to the process of S10. When the condition requiring that the Z direction speed is a positive speed and is equal to or greater than the second speed threshold value Vth2 is not satisfied even if a predetermined time has elapsed in the process of S14, the determination unit 30 may transition to the process of S18 and cancel the click mode.

Another example of the second condition will now be described. The determination unit 30 may determine whether the second condition requiring that the Z direction speed of the fingertip 50 is a negative speed and the absolute value of the Z direction speed is equal to or less than the second speed threshold value Vth2 is satisfied. The second speed threshold value Vth2 is less than the first speed threshold value Vth1.

Figure 6:
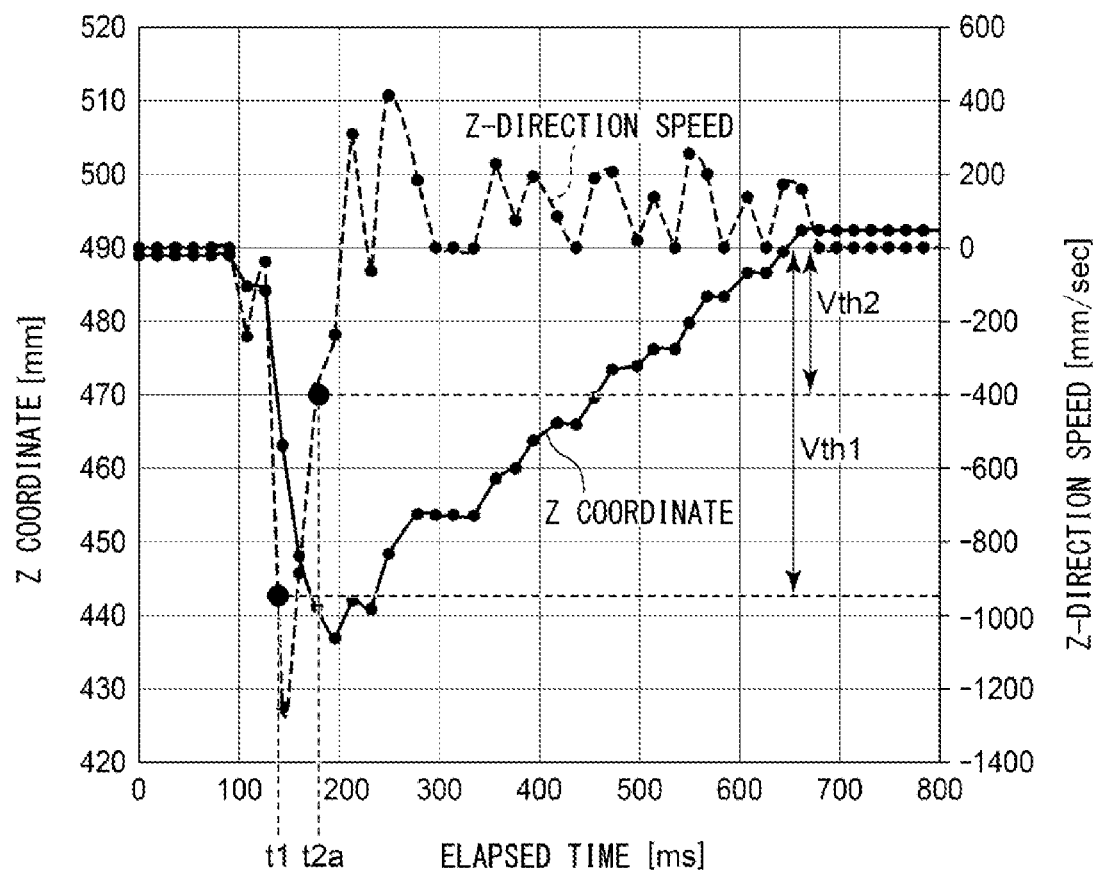
FIG. 6 is a diagram for explaining the process in the control apparatus during an aerial push action using a further second condition.

FIG. 6 is a diagram for explaining the process in the control apparatus 12 during an aerial push action using a further second condition. After the Z direction speed becomes a negative speed and the absolute value of the Z direction speed becomes equal to the first speed threshold value Vth1 at the first point of time t1 and before the fingertip 50 stops, the absolute value of the Z direction speed becomes equal to the second speed threshold value Vth2 at the second point of time t2a. That is, the control apparatus 12 can determine the X coordinate and the Y coordinate of the fingertip 50 when the absolute value of the speed of moving the fingertip 50 in the Z direction decreases. Compared with the example of FIG. 4, the time from the first point of time t1 to the second point of time t2a can be shortened, and the control apparatus 12 can determine that an aerial push action has been performed at an earlier point of time.

Figure 7:
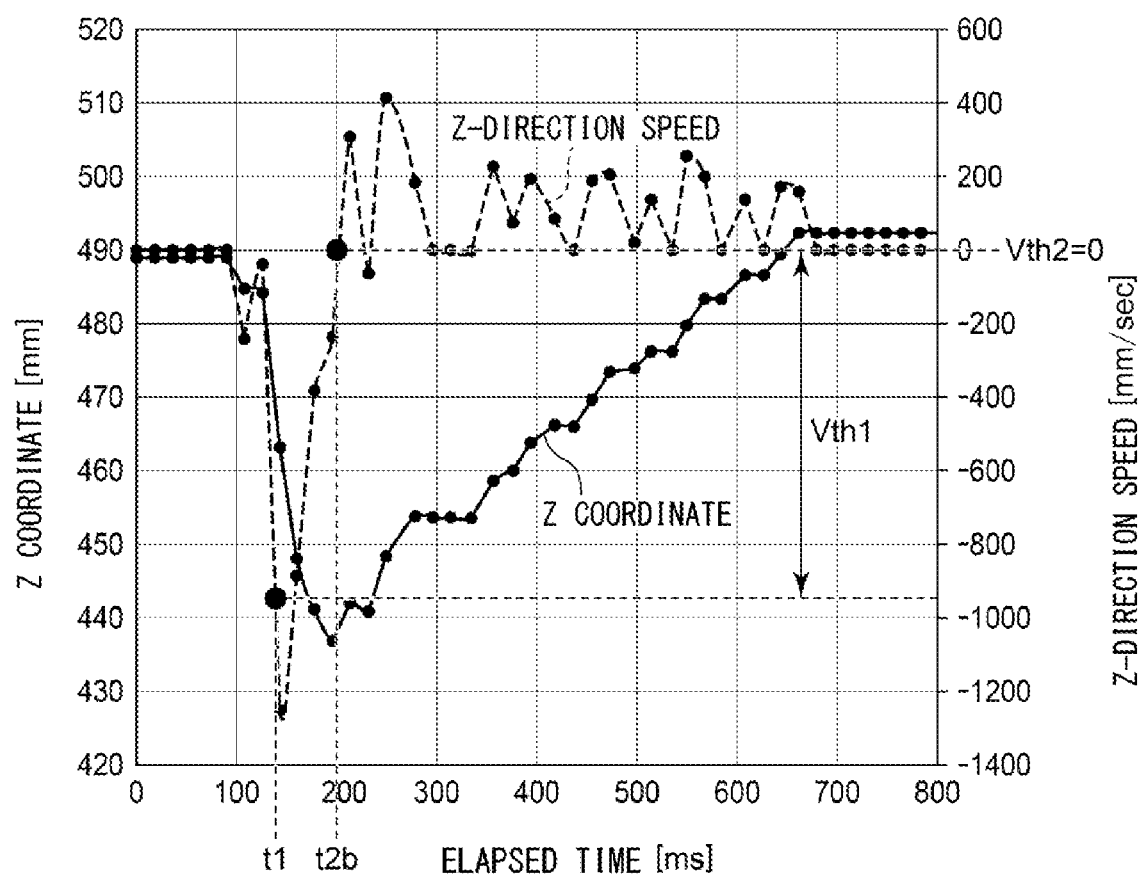
FIG. 7 is a diagram for explaining the process in the control apparatus during an aerial push action using a still further second condition.

Alternatively, a still further second condition may be used. The determination unit 30 may determine whether the second condition requiring that the Z direction speed of the fingertip 50 is equal to the second speed threshold value Vth2 or is a positive speed is satisfied. The second speed threshold value Vth2 is 0. FIG. 7 is a diagram for explaining the process in the control apparatus 12 during an aerial push action using the still further second condition. After the absolute value of the Z direction speed becomes equal to the first speed threshold value Vth1 at the first point time t1, the Z direction speed becomes equal to the second speed threshold value Vth2 at the second point of time t2b when the fingertip 50 stops. That is, the control apparatus 12 can determine the X coordinate and the Y coordinate of the fingertip 50 when the fingertip 50 stops with respect to the Z direction. Compared with the example of FIG. 4, the second speed threshold value Vth2 is smaller so that the time from the first point of time t1 to the second point of time t2a can be shortened, and the control apparatus 12 can determine that an aerial push action has been performed at an earlier point of time.

Second Embodiment

The second embodiment differs from the first embodiment in that the condition for the determination unit 30 to transition to the click mode also includes a condition related to the amount of movement in the X direction and the amount of movement in the Y direction. The following description highlights the difference from the first embodiment.

Figure 8:
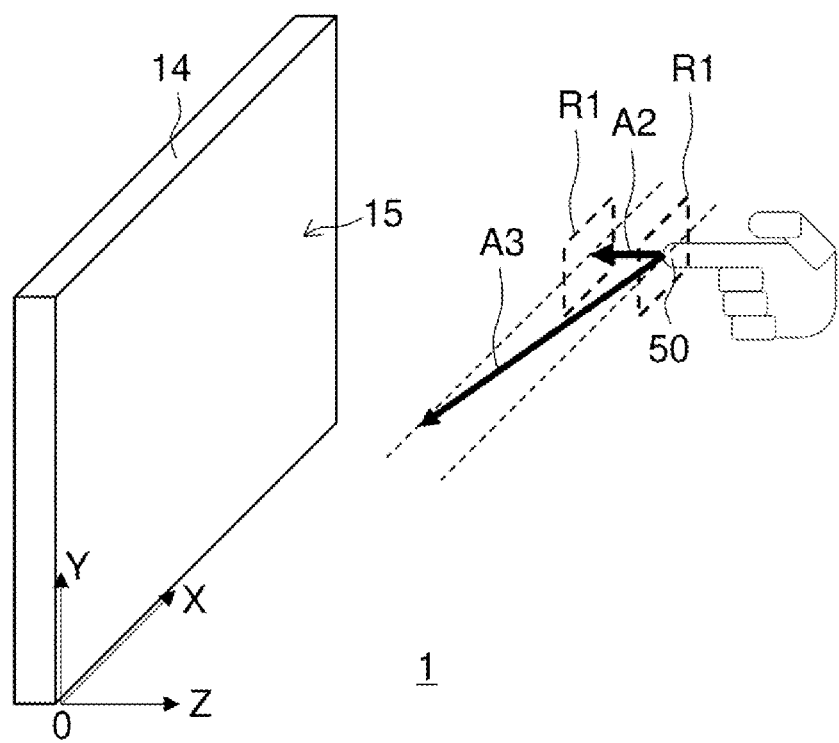
FIG. 8 is a diagram for explaining the process in the information processing system of the second embodiment.

FIG. 8 is a diagram for explaining the process in the information processing system 1 of the second embodiment. When the information processing system 1 can also receive a slide action or a flick action of the fingertip 50 in the air, the fingertip 50 may perform a slide action or a flick action while approaching the display surface 15. That is, the fingertip 50 may move in the direction of the arrow A3 in FIG. 8. In this case, the process according to the first embodiment may result in the determination unit 30 transitioning to the click mode even when the user moves the fingertip 50 in the direction of the arrow A3 without an intention of performing an aerial push action.

Therefore, the following process is performed in this embodiment. Based on the calculated spatial coordinates, the calculation unit 28 periodically calculates the first movement amount, which is the movement amount of the fingertip 50 in the X direction per a predetermined period of time, and the second movement amount, which is the movement amount of the fingertip 50 in the Y direction per a predetermined period of time. The calculation unit 28 supplies the first movement amount and the second movement amount thus calculated to the determination unit 30. The predetermined period of time is a natural number multiple of the interval of range images captured by the sensor 10 and can be appropriately determined by experiments or simulations.

The storage unit 22 further maintains movement amount threshold information (not shown). The movement amount threshold information includes information on the first movement amount threshold value that is a predetermined value and the second movement amount threshold value that is a predetermined value. The first movement amount threshold value and the second movement amount threshold value can be appropriately determined by experiments or simulations. The first movement amount threshold value and the second movement amount threshold value may be set by the user.

Based on the movement amount threshold information maintained in the storage unit 22, the determination unit 30 determines whether the third condition requiring that the first movement amount calculated by the calculation unit 28 is equal to or less than the first movement amount threshold value is satisfied and determines whether the fourth condition requiring that the second movement amount calculated by the calculation unit 28 is equal to or less than the second movement amount threshold value is satisfied. When the first condition, the third condition, and the fourth condition are satisfied, the determination unit 30 transitions to the click mode.

The region R1 shown in FIG. 8 shows an example of a region defined by the first movement amount threshold value and the second movement amount threshold value. When the fingertip 50 moves in the direction of the arrow A3, the position of the fingertip 50 leaves the region R1 so that the third condition and the fourth condition are not satisfied. Therefore, the determination unit 30 does not transition to the click mode in the second embodiment. Therefore, it is possible to inhibit the execution of an action unintended by the user in the information processing system 1.

When the fingertip 50 moves in the direction of the arrow A2, on the other hand, the third condition and the fourth condition are satisfied since the position of the fingertip 50 is in the region R1. Therefore, the determination unit 30 transitions to the click mode.

When the determination unit 30 determines that the first condition, the third condition, and the fourth condition are satisfied at the first point of time and that the second condition is satisfied at the second point of time, the function execution unit 34 executes the process in the display 14 based on the X direction coordinate and the Y direction coordinate at a point of time between the first point of time and the second point of time.

The determination unit 30 may perform the process using either one of the third condition or the fourth condition and without using the other. When the information processing system 1 can receive a slide action or a flick action only in the X direction, for example, the user is unlikely to perform a slide action or a flick action in the Y direction. In such a case, the determination unit 30 may use the third condition and may not use the fourth condition. This can simplify the process in the control unit 20.

Figure 9:
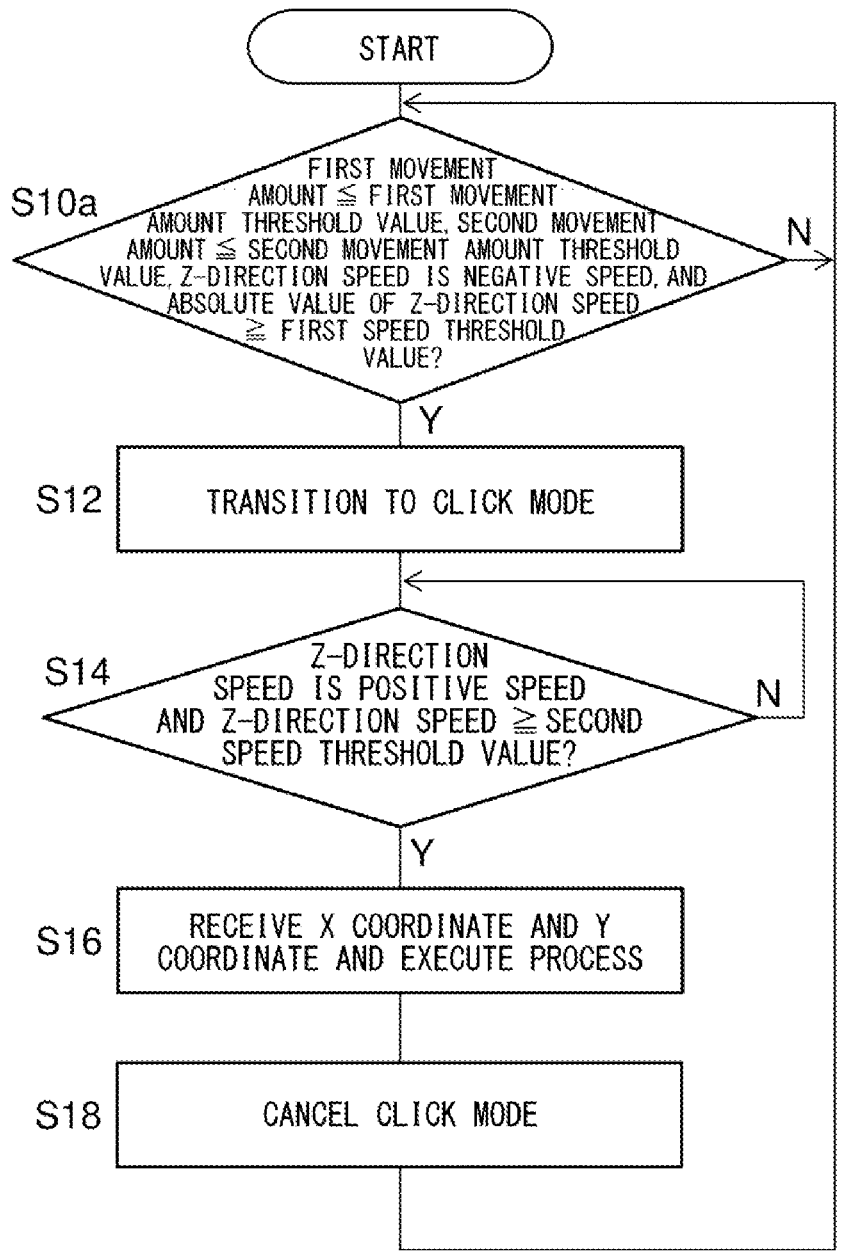
FIG. 9 is a flowchart showing the process in the information processing system of the second embodiment.

FIG. 9 is a flowchart showing the process in the information processing system 1 of the second embodiment. In the process shown in FIG. 9, the process of S10a is performed instead of the process of S10 in FIG. 5. The determination unit 30 determines whether the first movement amount in the X direction is equal to or less than the first movement amount threshold value, whether the second movement amount in the Y direction is equal to or less than the second movement amount threshold value, whether the Z direction speed is a negative speed, and whether the absolute value of the Z direction speed is equal to or greater than the first speed threshold value Vth1 (S10a). When this condition is not satisfied (N in S10a), the determination unit 30 returns to the process of S10a. When the first movement amount is equal to or less than the first movement amount threshold value, the second movement amount is equal to or less than the second movement amount threshold value, the Z direction speed is a negative speed, and the absolute value of the Z direction speed is equal to or greater than the first speed threshold value Vth1 (Y in S10a), the determination unit 30 transitions to the click mode (S12). The subsequent processes are the same as those shown in FIG. 5.

Third Embodiment

The third embodiment differs from the first embodiment in that the function execution unit 34 executes the process in the display 14 based on the average value of the X coordinates and the average value of the Y coordinates of the fingertip 50. The following description highlights the difference from the first embodiment.

Figure 10:
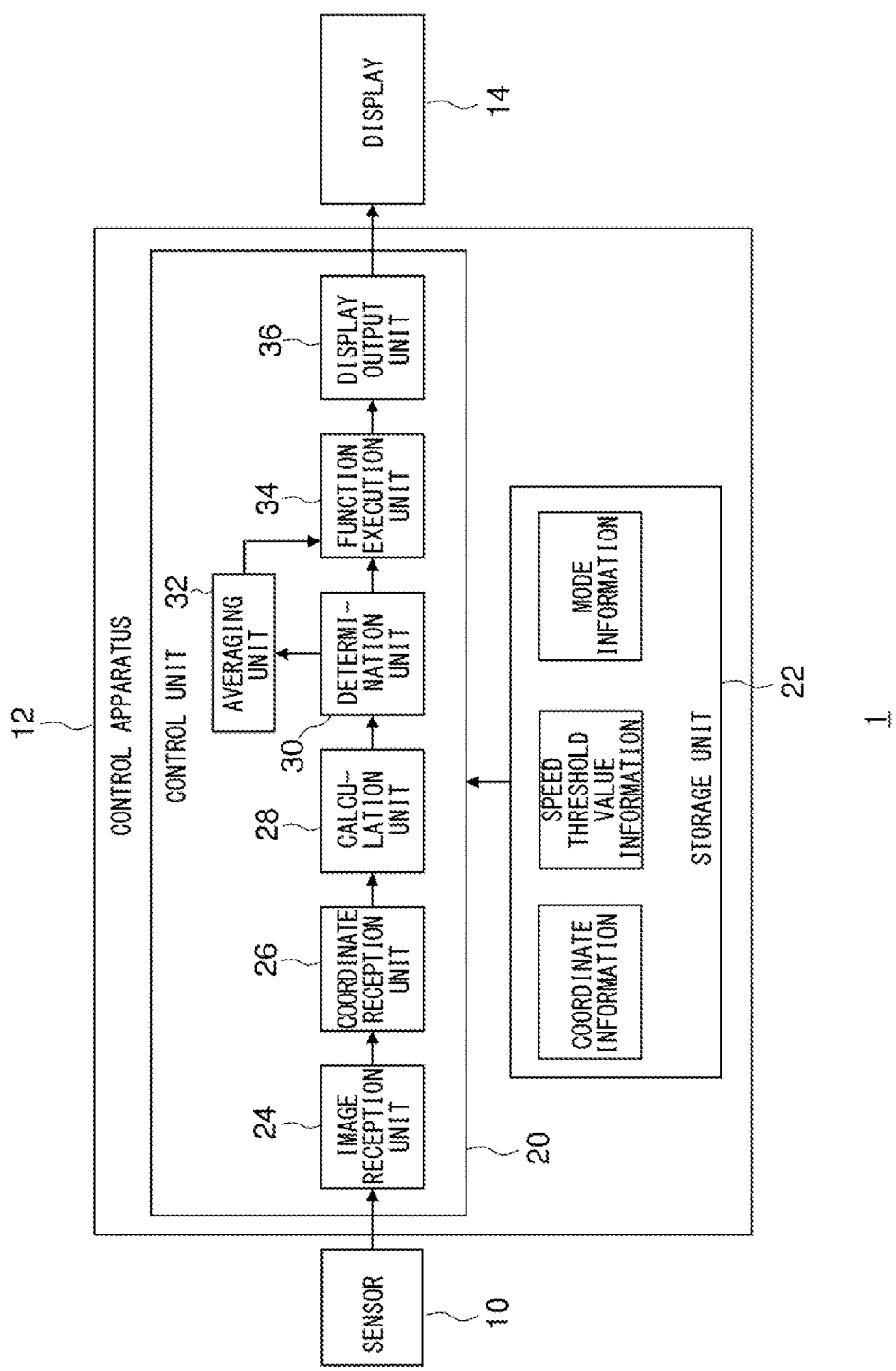
FIG. 10 is a block diagram of the information processing system of the third embodiment.

FIG. 10 is a block diagram of the information processing system 1 of the third embodiment. The control unit 20 further includes an averaging unit 32. The determination unit 30 also supplies the determination result to the averaging unit 32.

Based on the result of determination by the determination unit 30 and the spatial coordinates calculated by the calculation unit 28, the averaging unit 32 calculates the first average coordinate derived from averaging the X direction coordinates of the fingertip 50 and the second average coordinate derived from averaging the Y direction coordinates of the fingertip 50 in a predetermined period between the first point of time and the second point of time. The averaging unit 32 supplies the first average coordinate and the second average coordinate thus calculated to the function execution unit 34.

The predetermined period over which averaging is performed may be the entire period from the first point of time to the second point of time or may be a part of the period. The start point and the end point of the predetermined period can be appropriately defined by experiments or simulations so that the first average coordinate and the second average coordinate can easily approximate the coordinate intended by the user. The start point and the end point of the predetermined period may be set by the user.

When the determination unit 30 determines that the first condition is satisfied at the first point of time and the second condition is satisfied at the second point of time, the function execution unit 34 executes the process in the display 14 based on the first average coordinate and the second average coordinate supplied from the averaging unit 32.

This process is equivalent to the function execution unit 34 executing the process in the display 14, based on the X-axis coordinates and the Y-axis coordinates of the fingertip 50 at a plurality of points of time from the first point of time to the second point of time when the first condition related to the change in Z-axis coordinate is satisfied at the first time point and, subsequently, the second condition related to the change in Z-axis coordinate is satisfied at the second point of time.

Since the position of the finger approaching the display surface by an aerial push action tends to shift in the X direction and the Y direction, the X coordinate and the Y coordinate of the fingertip 50 may not be stable. By using the first average coordinate and the second average coordinate, the accuracy of calculation of the X coordinate and the Y coordinate corresponding to the position of the fingertip 50 can be improved.

Figure 11:
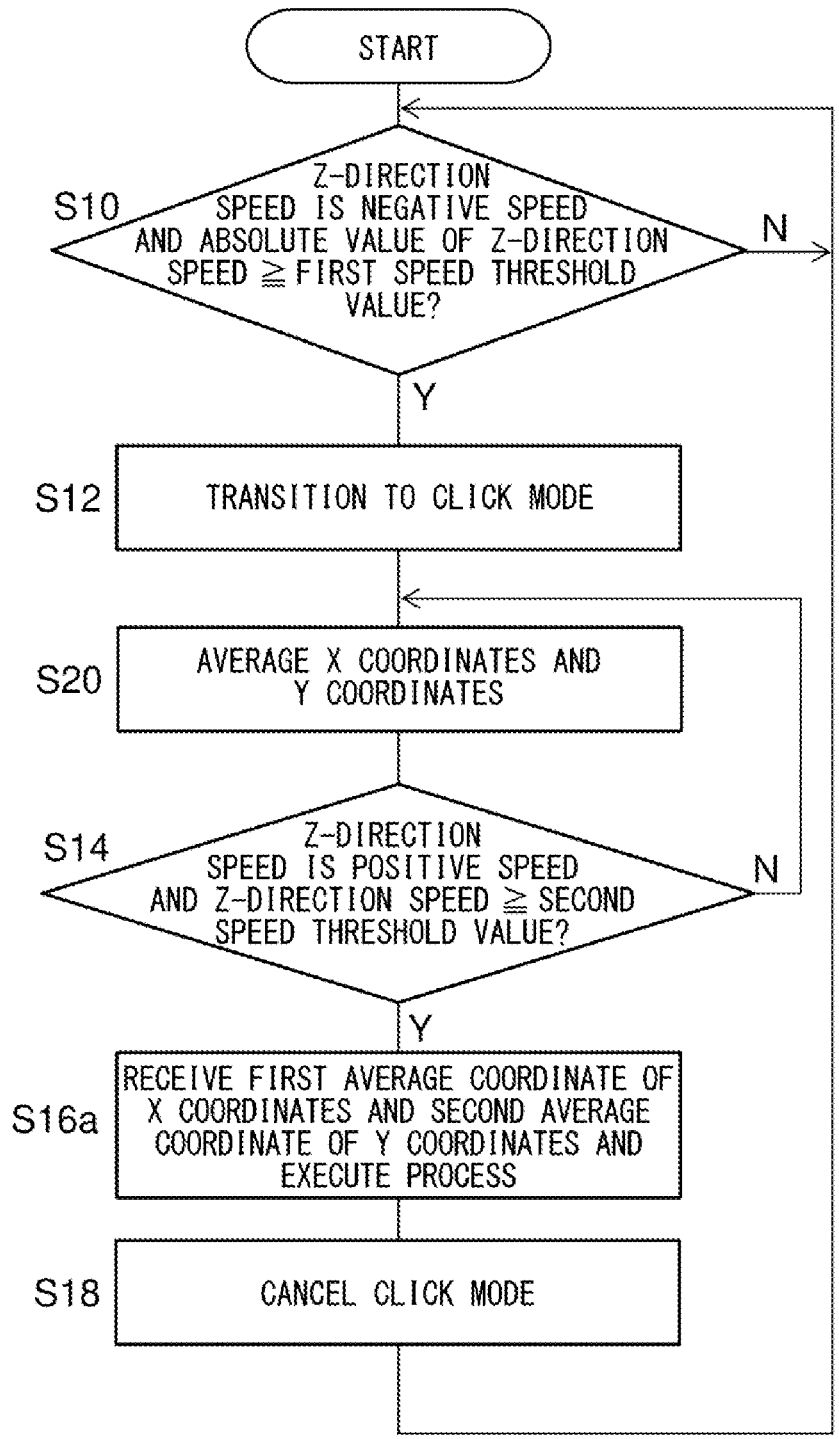
FIG. 11 is a flowchart showing the process in the information processing system of the third embodiment.

FIG. 11 is a flowchart showing the process in the information processing system 1 of the third embodiment. In the process shown in FIG. 11, the process of S20 is added between the process of S12 and the process of S14 in FIG. 5, and the process of S16a is performed instead of the process of S16 in FIG. 5. After the process of S12, the averaging unit 32 averages the X coordinates and the Y coordinates of the fingertip 50, respectively (S20). When the condition requiring that the Z direction speed is a positive speed and is equal to or greater than the second speed threshold value Vth2 is not satisfied (N in S14), the process in the information processing system 1 returns to the process of S20 performed by the averaging unit 32. When the Z direction speed is a positive speed and is equal to or greater than the second speed threshold value Vth2 (Y in S14), on the other hand, the function execution unit 34 receives the first average coordinate of the X coordinates of the fingertip 50 and the second average coordinate of the Y coordinates of the fingertip 50 and executes the process (S16a).

The averaging unit 32 may calculate a weighted average of the X coordinates and the Y coordinates of the fingertip 50. The closer to the second point of time, the larger the weight may be, or the closer to the second point of time, the smaller the weight may be. The weight can be appropriately defined by experiments or simulations so that the first average coordinate and the second average coordinate can easily approximate the coordinate intended by the user. The weight may be a predetermined value regardless of the user or may be set for each user. By setting the weight for each user, the accuracy of calculation of the X coordinate and the Y coordinate corresponding to the position of the fingertip 50 can be further improved to suit the user's habit in the push action.

Fourth Embodiment

In the fourth embodiment, the condition for receiving an aerial push action is different from that of the first embodiment in that the condition also includes a condition related to the amount of movement in the Z direction in the click mode. The following description highlights the difference from the first embodiment.

The determination unit 30 also supplies the determination result to the calculation unit 28. The calculation unit 28 calculates a total movement amount that is a sum of the amounts of movement of the fingertip 50 in the Z direction from the first point of time to the second point of time, based on the calculated spatial coordinates, and supplies the total movement amount to the determination unit 30.

The storage unit 22 further maintains movement amount threshold information (not shown). The movement amount threshold information includes information on a total movement amount threshold value that is a predetermined value. The total movement amount threshold value can be appropriately determined by experiments or simulations. The total movement amount threshold value may be set by the user.

Based on the movement amount threshold information maintained in the storage unit 22, the determination unit 30 determines whether a movement amount condition requiring that the total movement amount calculated by the calculation unit 28 is equal to or greater than the total movement amount threshold value is satisfied, and supplies the determination result to the function execution unit 34.

When the determination unit 30 determines that the first condition is satisfied at the first point of time, that the second condition is satisfied at the second point of time, and that the movement amount condition is satisfied, the function execution unit 34 executes the process in the display 14 based on the X direction coordinate and the Y direction coordinate of the fingertip 50 at a point of time between the first point of time and the second point of time.

Figure 12:
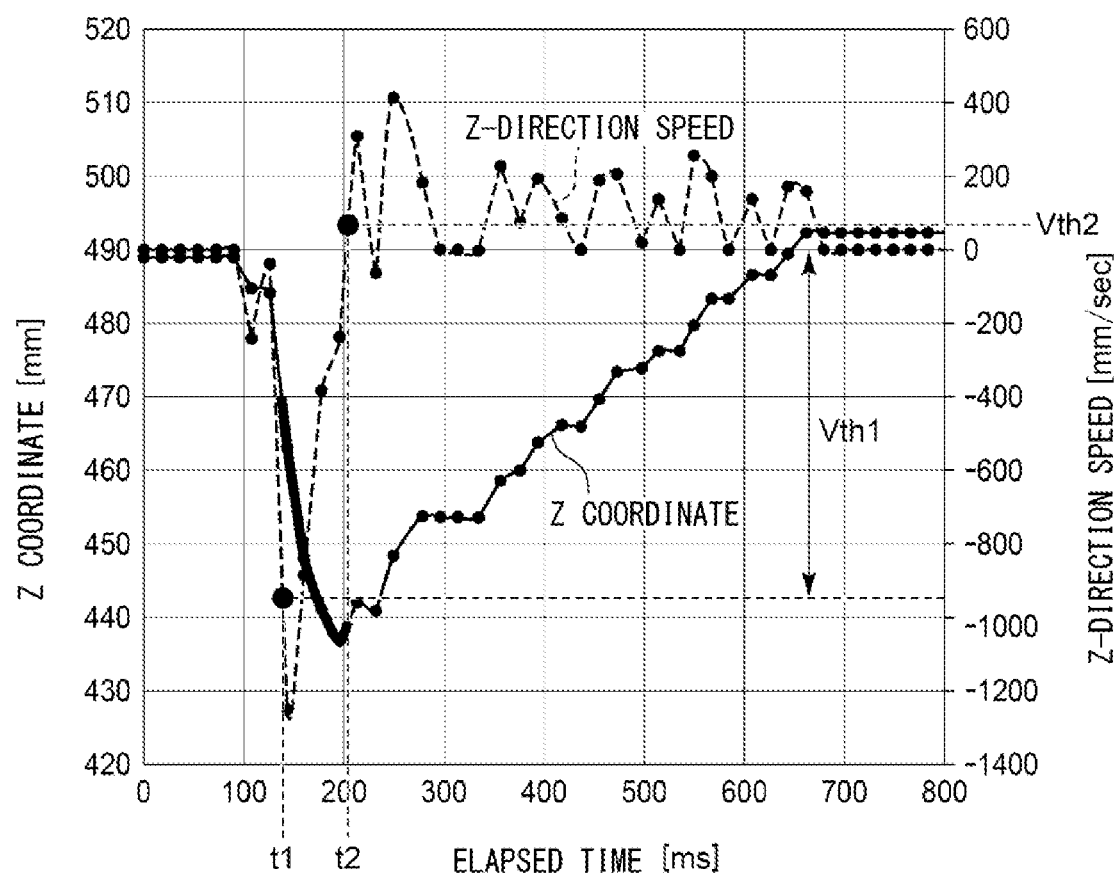
FIG. 12 is a diagram for explaining the process in the control apparatus during an aerial push action of the fourth embodiment.

FIG. 12 is a diagram for explaining the process in the control apparatus 12 during an aerial push action of the fourth embodiment. In this example, the total movement amount in the Z direction from the first point of time t1 to the second point of time t2 is equal to or greater than the total movement amount threshold value so that the function execution unit 34 executes the process based on the X coordinate and the Y coordinate of the fingertip 50 at the second point of time t2.

When the movement amount condition is not considered, for example, the speed of the fingertip 50 in the Z direction may be determined to be equal to or less than the first speed threshold Vth1, and the process in the display 14 may be executed, even when the user moves the fingertip 50 in the Z direction without having an intention of performing an aerial push action. As a result, an operation in the display 14 may be executed that is not intended by the user. In this embodiment, the likelihood that the process in the display 14 is executed only when the user moves the fingertip 50 with an intention of performing an aerial push action is increased by considering the movement amount condition. Therefore, it is possible to inhibit the execution of the process in the display 14 unintended by the user.

Figure 13:
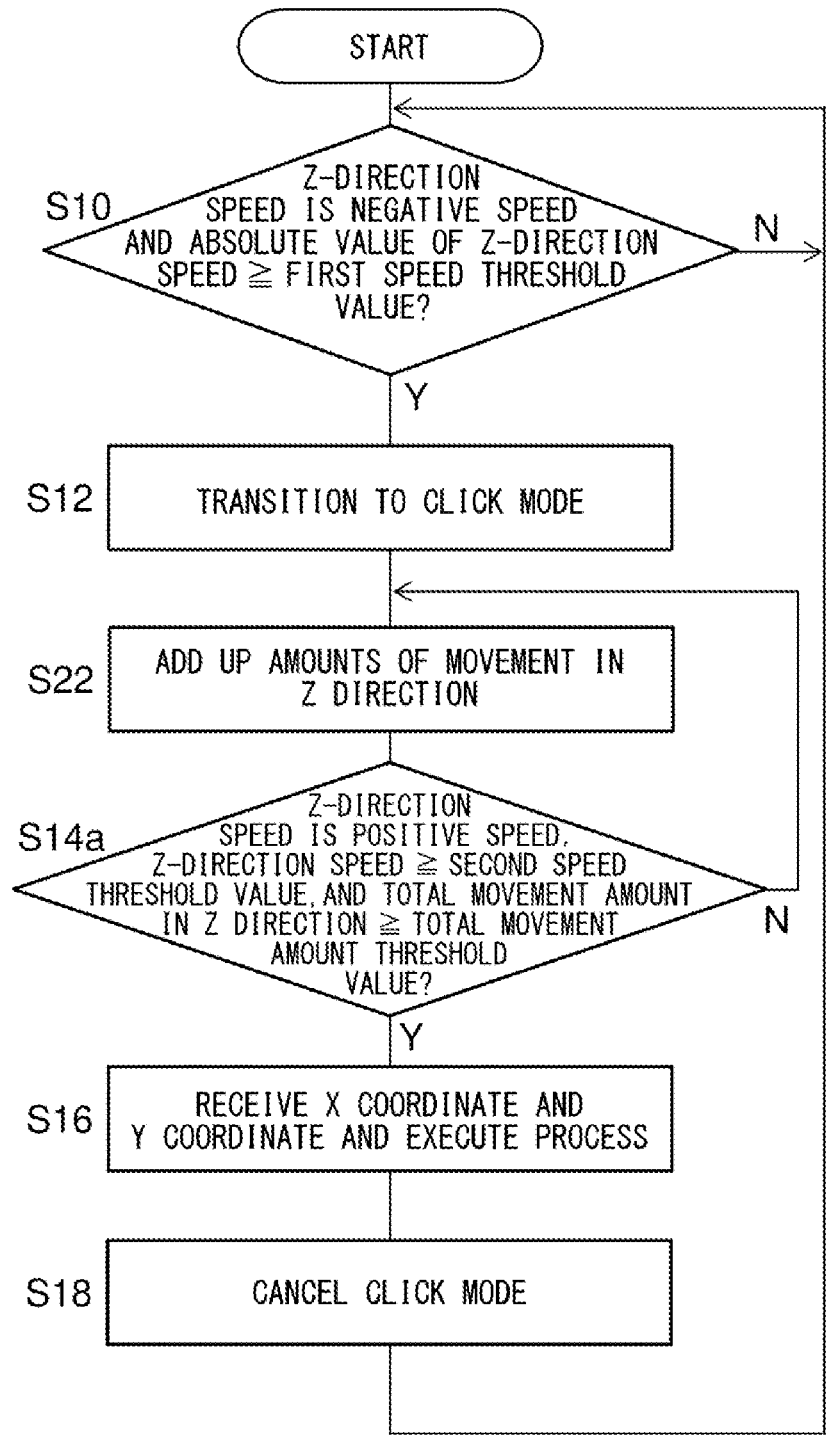
FIG. 13 is a flowchart showing the process in the information processing system of the fourth embodiment.

FIG. 13 is a flowchart showing the process in the information processing system 1 of the fourth embodiment. In the process shown in FIG. 13, the process of S22 is added between the processes of S12 and S14 in FIG. 5, and the process of S14a is performed instead of the process of S14 in FIG. 5. After the process of S12, the calculation unit 28 adds up the amounts of movement of the fingertip 50 in the Z direction (S22). Subsequently, the determination unit 30 determines whether the Z direction speed is a positive speed, whether the Z direction speed is equal to or greater than the second speed threshold Vth2, and whether the total movement amount in the Z direction is equal to or greater than the total movement amount threshold (S14a). When this condition is not satisfied (N in S14a), the process in the information processing system 1 returns to the process of S22 by the calculation unit 28. When the Z direction speed is a positive speed, the Z direction speed is equal to or greater than the second speed threshold Vth2, and the total movement amount in the Z direction is equal to or greater than the total movement amount threshold (Y in S14a), the process in the information processing system 1 moves to the processing of S16 by the function execution unit 34. When the condition requiring that the Z direction speed is a positive speed, that the Z direction speed is equal to or greater than the second speed threshold Vth2, and that the total movement amount in the Z direction is equal to or greater than the total movement amount threshold is not satisfied in the process of S14a even after a predetermined time has elapsed, the determination unit 30 may transition to the process of S18 and cancels the click mode.

Any two of the second embodiment, the third embodiment, and the fourth embodiment described above may be combined, or three may be combined. New embodiments created by the combination provide the respective advantages of embodiments combined.

Figure 14:
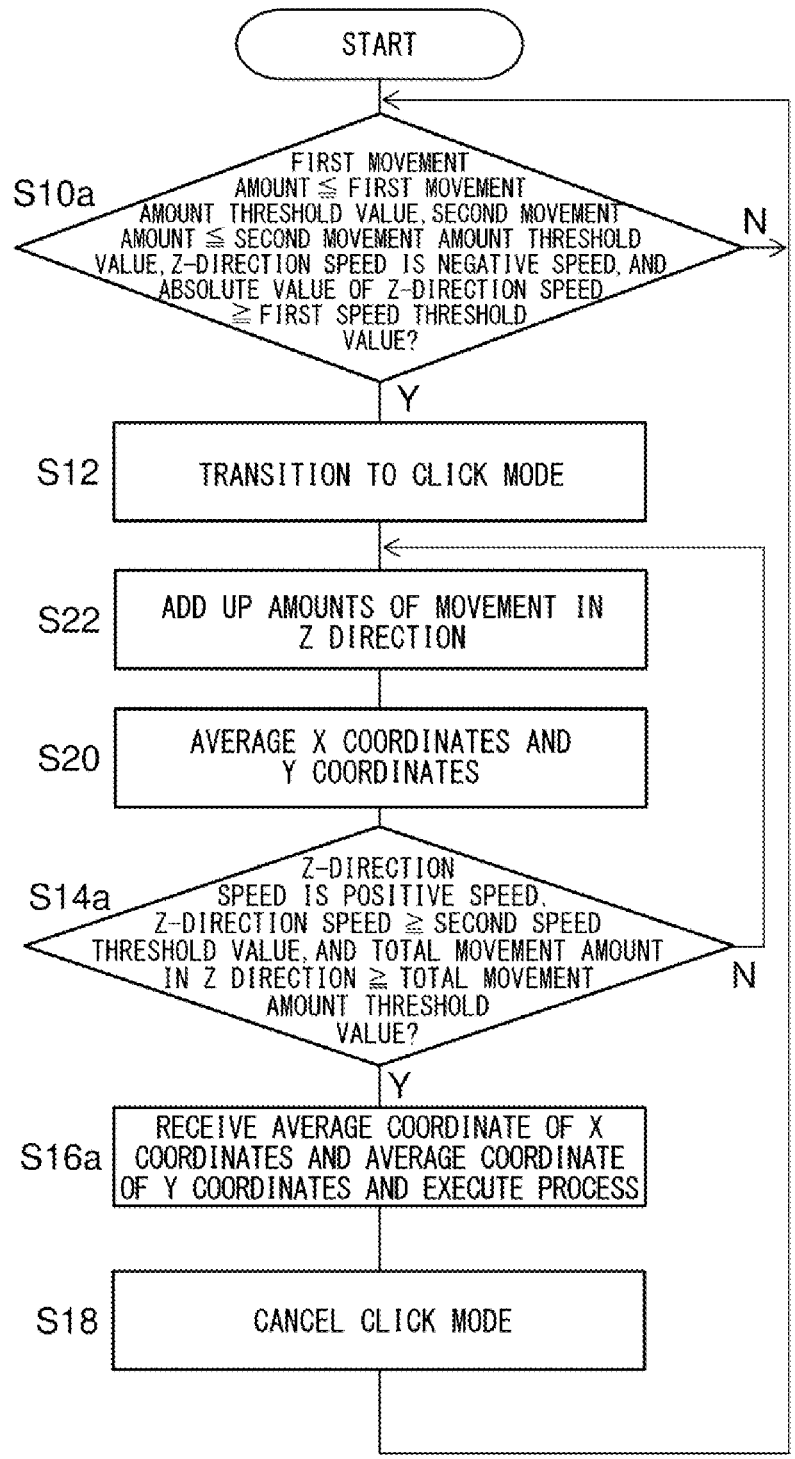
FIG. 14 is a flowchart showing the process in the information processing system combining the second embodiment, the third embodiment, and the fourth embodiment.

FIG. 14 is a flowchart showing the process in the information processing system 1 combining the second embodiment, the third embodiment, and the fourth embodiment. In the process shown in FIG. 14, the processes of S22 of FIG. 13 and S20 of FIG. 11 are added between the processes of S12 and S14 of FIG. 9. The process of S14a in FIG. 13 is performed instead of the process of S14 in FIG. 9, and the process of S16a in FIG. 11 is performed instead of the process of S16 in FIG. 9.

After the process of S12, the calculation unit 28 adds up the amounts of movement of the fingertip 50 in the Z direction (S22). The averaging unit 32 averages the X coordinates and the Y coordinates of the fingertip 50, respectively (S20). The sequence of the processes of S22 and S20 may be inverted. The determination unit 30 determines whether the Z direction speed is a positive speed, whether the Z direction speed is equal to or greater than the second speed threshold Vth2, and whether the total movement amount in the Z direction is equal to or greater than the total movement amount threshold value (S14a). When this condition is not satisfied (N in S14a), the process in the information processing system 1 returns to the process of S22 by the calculation unit 28. When the Z direction speed is a positive speed, the Z direction speed is equal to or greater than the second speed threshold value Vth2, and the total movement amount in the Z direction is equal to or greater than the total movement amount threshold value (Y in S14a), the function execution unit 34 receives the first average coordinate of the X coordinates of the fingertip 50 and the second average coordinate of the Y coordinates of the fingertip 50 and executes the process (S16a).

Fifth Embodiment

In the fifth embodiment, the information processing system 1 detects an aerial push action in a direction different from that of the first embodiment. The following description highlights the difference from the first embodiment.

Figure 15A:
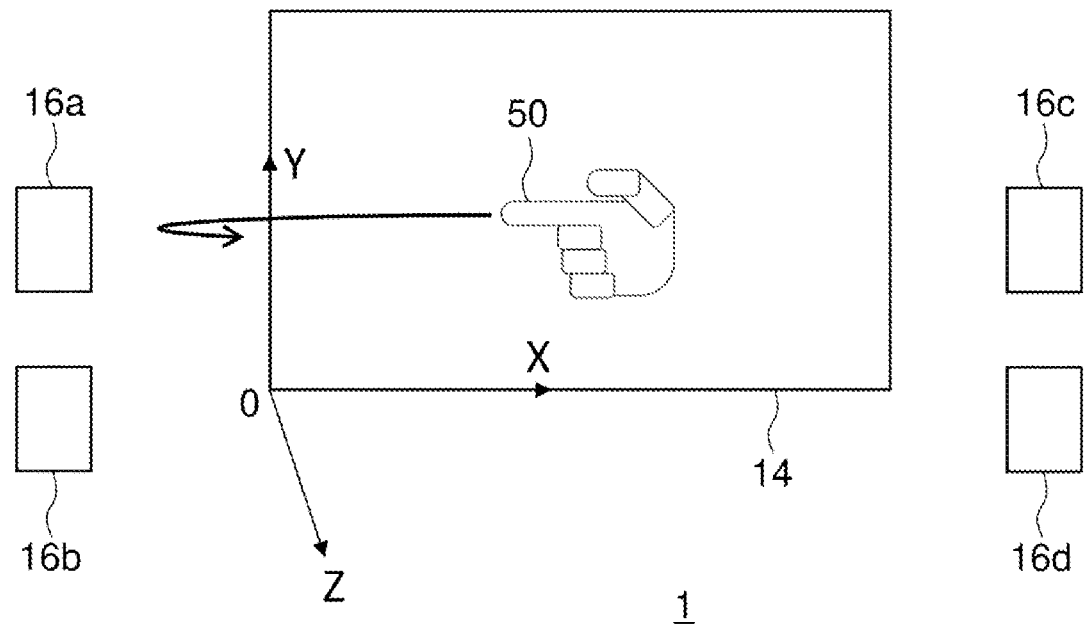
FIGS. 15A and 15B are diagrams for explaining an aerial push action in the information processing system of the fifth embodiment.
Figure 15B:
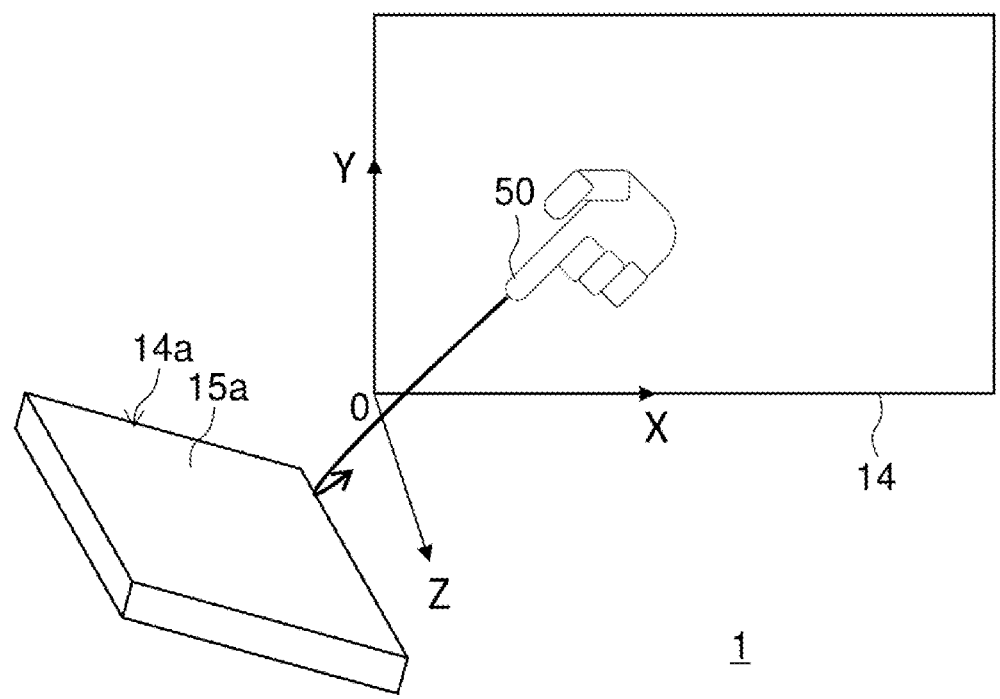

FIGS. 15A and 15B are diagrams for explaining an aerial push action in the information processing system 1 of the fifth embodiment. FIG. 15A shows an example in which the information processing system 1 detects an aerial push action in a direction parallel to the X direction. In this example, the information processing system 1 detects an aerial push action parallel to either the X direction, the Y direction, or the Z direction.

The information processing system 1 further includes a first speaker 16a, a second speaker 16b, a third speaker 16c, and a fourth speaker 16d. Hereinafter, these speakers will be referred to as "speakers 16" in the case no distinction made. The first speaker 16a and the second speaker 16b are arranged side by side in the Y direction on the left side of the display 14. The third speaker 16c and the fourth speaker 16d are arranged side by side in the Y direction on the right side of the display 14. The speaker 16 is an example of electronic equipment that is a target of control. The positional relationship between the display 14 and the three-dimensional Cartesian coordinate system is the same as, for example, the example shown in FIG. 2.

In the illustrated example, the user performs a push action that moves the fingertip 50 from right to left toward the first speaker 16a. The calculation unit 28 identifies whether the movement direction of the fingertip 50 is the positive direction (or the negative direction) of the X axis, the Y axis, or the Z axis, based on the change in the spatial coordinates of the fingertip 50. In this example, the calculation unit 28 identifies that the movement direction of the fingertip 50 is the negative direction in the X axis. The calculation unit 28 calculates the speed of the fingertip 50 in the X direction on a time series basis, based on the spatial coordinates of the fingertip 50. When the absolute value of the speed of the fingertip 50 in the X direction becomes equal to or greater than the first speed threshold Vth1 and then the X direction speed is inverted between a negative speed and a positive speed, the function execution unit 34 executes the process corresponding to the push action, based on the Y coordinate and the Z coordinate of the fingertip 50 occurring when the X direction speed is inverted between a negative speed and a positive speed. The process corresponding to the push action may include, for example, turning on the power of the first speaker 16a located at a position in the negative direction of the X axis and corresponding to the Y coordinate and the Z coordinate identified.

When the user moves the fingertip 50 from right to left toward the second speaker 16b, the function execution unit 34 turns on the power of the second speaker 16b when the speed of the fingertip 50 in the X direction satisfies the above-described condition. In this example, the second speaker 16b is located at a position in the negative direction of the X axis and corresponding to the X coordinate and the Z coordinate of the fingertip 50 occurring when the speed of the fingertip 50 in the X direction is inverted between a negative speed and a positive speed.

When the user moves the fingertip 50 from left to right toward the third speaker 16c, on the other hand, the calculation unit 28 identifies that the movement direction of the fingertip 50 is the positive direction of the X axis, based on the change in the spatial coordinates of the fingertip 50. In this case, the calculated speed of the fingertip 50 in the X direction has a positive value. After the absolute value of the speed of the fingertip 50 in the X direction becomes equal to or greater than the first speed threshold Vth1 and then the speed in the X direction is inverted between a negative speed and a positive speed, the function execution unit 34 turns on the power of the third speaker 16c. In this example, the third speaker 16c is located at a position in the positive direction of the X axis and corresponding to the Y coordinate and the Z coordinate of the fingertip 50 occurring when the X-direction speed is inverted between a negative speed and a positive speed.

Further, when the user moves the fingertip 50 toward the display surface of the display 14, the calculation unit 28 identifies that the movement direction of the fingertip 50 is the negative direction of the Z axis. In this case, the process of the first embodiment is executed.

Thus, the information processing system 1 can detect an aerial push action parallel to either X direction, the Y direction, or the Z direction. Therefore, the user can, with an aerial push action, control not only the electronic equipment located in the front direction of the user but also the electronic equipment located in the left, right, upward, or downward direction.

FIG. 15B shows an example in which the information processing system 1 detects an aerial push action in a direction intersecting the X direction, the Y direction, and the Z direction. In this example, the information processing system 1 detects an aerial push action in an arbitrary direction. The information processing system 1 further includes a display 14a. A display surface 15a of the display 14a intersects the X direction, the Y direction, and the Z direction.

It is assumed that the user moves the fingertip 50 parallel to the normal direction of the display surface 15a of the display 14a. The calculation unit 28 identifies the movement direction of the fingertip 50 based on the change in the spatial coordinates of the fingertip 50 in the three-dimensional Cartesian coordinate system set in advance with reference to the display 14. The direction parallel to the identified movement direction is defined as the first direction. The calculation unit 28 newly sets the second direction orthogonal to the first direction and the third direction orthogonal to the first direction and the second direction. That is, the calculation unit 28 sets a new three-dimensional Cartesian coordinate system with reference to the movement direction of the fingertip 50, which system is different from the preset three-dimensional Cartesian coordinate system. In the illustrated example, the first direction is the normal direction of the display surface 15a. The second direction and the third direction are, for example, directions parallel to the display surface 15a. The image reception unit 24 calculates the time series spatial coordinates of the user's fingertips 50 in the new three-dimensional Cartesian coordinate system. The coordinate reception unit 26 receives the spatial coordinates from the image reception unit 24. The calculation unit 28 calculates the speed of the fingertip 50 in the first direction on a time series basis, based on the spatial coordinates of the fingertip 50 in the new three-dimensional Cartesian coordinate system. In this case, it is assumed that the calculated speed of the fingertip 50 in the first direction has a negative value. The direction approaching the display surface 15a will be defined as the negative first direction, and the direction away from the display surface 15a will be defined as the positive first direction.

When the speed of the fingertip 50 in the first direction is a negative speed and when the absolute value of the speed in the first direction becomes equal to or greater than the first speed threshold Vth1 and then the speed in the first direction is inverted from a negative speed to a positive speed, the function execution unit 34 executes the process corresponding to the push action based on the coordinate in the second direction and the coordinate in the third direction of the fingertip 50 occurring when the speed in the first direction is inverted from a negative speed to a positive speed. The coordinate in the second direction and the coordinate in the third direction are coordinates in the new three-dimensional Cartesian coordinate system. The process corresponding to the push action may include, for example, displaying, at a position on the display surface 15a of the display 14a parallel to the second direction and the third direction, an image indicating that the position is clicked, the position being defined by the coordinate in the second direction and the coordinate in the third direction identified.

Thus, the information processing system 1 can detect an aerial push action in a direction intersecting the X direction, the Y direction, and the Z direction. Accordingly, the user can also control, with an aerial push action, electronic equipment located in the lower left, lower right, upper left, or upper right direction of the user.

At least one of the second embodiment, the third embodiment, and the fourth embodiment may be combined with the fifth embodiment.

The present disclosure has been described above based on the embodiment. The embodiment is intended to be illustrative only and it will be understood by those skilled in the art that various modifications to combinations of constituting elements and processes are possible and that such modifications are also within the scope of the present disclosure.

One embodiment of the present disclosure is summarized below.

[Item 1]
A control apparatus including:
a coordinate reception unit that receives time series spatial coordinates of an object to be detected, the spatial coordinates including a coordinate in a first direction, a coordinate in a second direction intersecting the first direction, and a coordinate in a third direction intersecting the first direction and the second direction; and
a function execution unit that, when a predetermined first condition related to a change in the coordinate in the first direction is satisfied at a first point of time and then a predetermined second condition related to a change in the coordinate in the first direction is satisfied at a second point of time, executes a process in electronic equipment that is a target of control, based on the coordinate in the second direction and the coordinate in the third direction at one or more points of time between the first point of time and the second point of time.

According to this embodiment, it is possible to allow the user to perform an action of determining coordinates in the second direction and the third direction intuitively in a short period of time.

[Item 2]
The control apparatus according to item 1 further including:
a calculation unit that calculates a speed of the object to be detected in the first direction, based on the spatial coordinates, the speed occurring when the coordinate of the object to be detected in the first direction becomes smaller being a speed in a negative direction; and
a determination unit that determines whether the first condition requiring that the speed is a speed in a negative direction and that an absolute value of the speed is equal to or greater than a predetermined first speed threshold value is satisfied and determines whether the second condition requiring that the speed is a speed in a positive direction is satisfied,
wherein the function execution unit executes the process in the electronic equipment based on the coordinate in the second direction and the coordinate in the third direction at one or more points of time between the first point of time and the second point of time when the determination unit determines that the first condition is satisfied at the first point of time and the second condition is satisfied at the second point of time.

According to this embodiment, it is possible to determine the coordinate intuitively by an action of pushing the object to be detected in the first direction in the air and then returning the object to be detected.

[Item 3]
The control apparatus according to item 2,
wherein the determination unit determines whether the second condition requiring that the speed is 0 or is a speed in a positive direction is satisfied.

In this case, it is possible to determine the coordinate after the object to be detected is pushed in the first direction and is then stopped.

[Item 4]
The control apparatus according to item 2,
wherein the determination unit determines whether the second condition requiring that the speed is a speed in a positive direction and is equal to or greater than a predetermined second speed threshold value is satisfied.

In this case, it is possible to determine the coordinate after the object to be detected is pushed in the first direction and is then returned.

[Item 5]
The control apparatus according to item 1, further comprising:
a calculation unit that calculates a speed of the object to be detected in the first direction, based on the spatial coordinates, the speed occurring when the coordinate of the object to be detected in the first direction becomes smaller being a speed in a negative direction; and
a determination unit that determines whether the first condition requiring that the speed is a speed in a negative direction and that an absolute value of the speed is equal to or greater than a predetermined first speed threshold value is satisfied and determines whether the second condition requiring that the speed is a speed in a positive direction and that an absolute value of the speed is equal to or less than a predetermined second speed threshold value smaller than the first speed threshold value is satisfied, wherein the function execution unit executes the process in the electronic equipment based on the coordinate in the second direction and the coordinate in the third direction at one or more points of time between the first point of time and the second point of time when the determination unit determines that the first condition is satisfied at the first point of time and the second condition is satisfied at the second point of time.

In this case, it is possible to determine the coordinate after the speed of moving the object to be detected in the first direction is decreased.

[Item 6]

The control apparatus according to any one of items 2 through 5, wherein the electronic equipment is a display, and wherein the first direction is a normal direction of a display surface of the display.

In this case, it is possible to determine the coordinate intuitively by an action of pushing the object to be detected in the air toward the display surface.

[Item 7]

The control apparatus according to any one of items 2 through 6, wherein the calculation unit periodically calculates a first movement amount that is an amount of movement of the object to be detected in the second direction per a predetermined period of time, based on the spatial coordinates;

wherein the determination unit determines whether a third condition requiring that the first movement amount is equal to or less than a predetermined first movement amount threshold value, and wherein the function execution unit executes the process in the electronic equipment based on the coordinate in the second direction and the coordinate in the third direction at one or more points of time between the first point of time and the second point of time when the determination unit determines that the first condition and the third condition are satisfied at the first point of time and the second condition is satisfied at the second point of time.

In this case, it is possible to inhibit the execution of an action unintended by the user.

[Item 8]

The control apparatus according to item 7, wherein the calculation unit periodically calculating a second movement amount that is an amount of movement of the object to be detected in the third direction per a predetermined period of time, based on the spatial coordinates; and wherein the determination unit determines whether a fourth condition requiring that the second movement amount is equal to or less than a predetermined second movement amount threshold value, and wherein the function execution unit executes the process in the electronic equipment based on the coordinate in the second direction and the coordinate in the third direction at one or more points of time between the first point of time and the second point of time when the determination unit determines that the first condition, the third condition, and the fourth condition are satisfied at the first point of time and the second condition is satisfied at the second point of time.

In this case, it is possible to inhibit the execution of an action unintended by the user.

[Item 9]

The control apparatus according to any one of items 2 through 6, including:

an averaging unit that calculating a first average coordinate derived from averaging coordinates in the second direction and a second average coordinate derived from averaging coordinates in the third direction in a predetermined period between the first point of time and the second point of time, based on the spatial coordinates, wherein the function execution unit executes the process in the electronic equipment based on the first average coordinate and the second average coordinate when the determination unit determines that the first condition is satisfied at the first point of time and the second condition is satisfied at the second point of time. In this case, the accuracy of calculation of the coordinates can be improved.

[Item 10]

The control apparatus according to any one of items 2 through 6, wherein the calculation unit calculates a total movement amount that is a sum of the amounts of movement of the object to be detected in the first direction from the first point of time to the second point of time, based on the spatial coordinates, wherein the determination unit determines whether a movement amount condition requiring that the total movement amount is equal to or greater than a predetermined total movement amount threshold value, and wherein the function execution unit executes the process in the electronic equipment based on the coordinate in the second direction and the coordinate in the third direction at one or more points of time between the first point of time and the second point of time when the determination unit determines that the first condition is satisfied at the first point of time, that the second condition is satisfied at the second point of time, and that the movement amount condition is satisfied. In this case, it is possible to inhibit the execution of a process in the electronic equipment unintended by the user.

[Item 11]

A control method including:

receiving time series spatial coordinates of an object to be detected, the spatial coordinates including a coordinate in a first direction, a coordinate in a second direction intersecting the first direction, and a coordinate in a third direction intersecting the first direction and the second direction; and when a predetermined first condition related to a change in the coordinate in the first direction is satisfied at a first point of time and then a predetermined second condition related to a change in the coordinate in the first direction is satisfied at a second point of time, executing a process in electronic equipment that is a target of control, based on the coordinate in the second direction and the coordinate in the third direction at one or more points of time between the first point of time and the second point of time. According to this embodiment, it is possible to allow the user to perform an action of determining coordinates in the second direction and the third direction intuitively in a short period of time.

While various embodiments have been described herein above, it is to be appreciated that various changes in form and detail may be made without departing from the spirit and scope of the invention(s) presently or hereafter claimed.

CROSS-REFERENCE TO RELATED APPLICATIONS

This application is based upon and claims the benefit of priority from the prior Japanese Patent Application No. 2022-175603, filed on Nov. 1, 2022, the entire contents of which are incorporated herein by reference.

What is claimed is:

1. A control apparatus, comprising:
a memory in which a program is stored; and
a processor coupled to the memory and configured to perform processing by executing the program, the processing including:
  receiving time series spatial coordinates of an object to be detected, the time series spatial coordinates including a first coordinate in a first direction, a second coordinate in a second direction intersecting the first direction, and a third coordinate in a third direction intersecting the first direction and the second direction;
  calculating a speed of the object to be detected in the first direction, based on the time series spatial coordinates, the speed being calculated when the first coordinate of the object to be detected in the first direction becomes smaller and is in a negative direction;
  determining whether a predetermined first condition requiring that the speed is in the negative direction and that an absolute value of the speed is equal to or greater than a predetermined first speed threshold value is satisfied, and determining whether a predetermined second condition requiring that a second calculated speed is in a positive direction is satisfied; and
  when the predetermined first condition related to a first change in the first coordinate in the first direction is satisfied at a first point of time and then the predetermined second condition related to a second change in the first coordinate in the first direction is satisfied at a second point of time, executing a process in electronic equipment that is a target of control, based on the second coordinate in the second direction and the third coordinate in the third direction at one or more points of time between the first point of time and the second point of time,
wherein the executing of the process in the electronic equipment includes executing the process in the electronic equipment based on the second coordinate in the second direction and the third coordinate in the third direction at the one or more points of time between the first point of time and the second point of time when the predetermined first condition is satisfied at the first point of time and then the predetermined second condition is satisfied at the second point of time.

2. The control apparatus according to claim 1, wherein the predetermined second condition requires that the speed is 0 or in the positive direction.

3. The control apparatus according to claim 1, wherein the predetermined second condition requires that the speed in the positive direction is equal to or greater than a predetermined second speed threshold value.

4. The control apparatus according to claim 1, wherein the predetermined second condition further requires that an absolute value of the second calculated speed is equal to or less than a predetermined second speed threshold value, which is smaller than the first speed threshold value.

5. The control apparatus according to claim 1,
wherein the electronic equipment is a display, and
wherein the first direction is a normal direction of a display surface of the display.

6. The control apparatus according to claim 1,
wherein the processing further includes:
  periodically calculating a first movement amount that is an amount of movement of the object to be detected in the second direction per a predetermined period of time, based on the time series spatial coordinates; and
  determining whether a third condition requiring that the first movement amount is equal to or less than a predetermined first movement amount threshold value is satisfied, and
wherein the executing of the process in the electronic equipment includes executing the process in the electronic equipment based on the second coordinate in the second direction and the third coordinate in the third direction at the one or more points of time between the first point of time and the second point of time when the predetermined first condition and the third condition are satisfied at the first point of time and then the predetermined second condition is satisfied at the second point of time.

7. The control apparatus according to claim 6,
wherein the processing further includes:
  periodically calculating a second movement amount that is a second amount of movement of the object to be detected in the third direction per a second predetermined period of time, based on the time series spatial coordinates; and
  determining whether a fourth condition requiring that the second movement amount is equal to or less than a predetermined second movement amount threshold value is satisfied, and
wherein the executing of the process in the electronic equipment includes executing the process in the electronic equipment based on the second coordinate in the second direction and the third coordinate in the third direction at the one or more points of time between the first point of time and the second point of time when the predetermined first condition, the third condition, and the fourth condition are satisfied at the first point of time and then the predetermined second condition is satisfied at the second point of time.

8. The control apparatus according to claim 1,
wherein the processing further includes:
  calculating a first average coordinate derived from averaging coordinates in the second direction and a second average coordinate derived from averaging coordinates in the third direction in a predetermined period between the first point of time and the second point of time, based on the time series spatial coordinates, and
wherein the executing of the process in the electronic equipment includes executing the process in the electronic equipment based on the first average coordinate and the second average coordinate when the predetermined first condition is satisfied at the first point of time and then the predetermined second condition is satisfied at the second point of time.

9. The control apparatus according to claim 1,
wherein the processing further includes:

calculating a total movement amount that is a sum of amounts of movement of the object to be detected in the first direction from the first point of time to the second point of time, based on the time series spatial coordinates; and determining whether a movement amount condition requiring that the total movement amount is equal to or greater than a predetermined total movement amount threshold value is satisfied, and wherein the executing of the process in the electronic equipment includes executing the process in the electronic equipment based on the coordinate in the second direction and the coordinate in the third direction at one or more points of time between the first point of time and the second point of time when the predetermined first condition is satisfied at the first point of time, the predetermined second condition is satisfied at the second point of time, and the movement amount condition is satisfied.

10. A control method, comprising:

receiving time series spatial coordinates of an object to be detected, the time series spatial coordinates including a first coordinate in a first direction, a second coordinate in a second direction intersecting the first direction, and a third coordinate in a third direction intersecting the first direction and the second direction;

calculating a speed of the object to be detected in the first direction, based on the time series spatial coordinates, the speed being calculated when the first coordinate of the object to be detected in the first direction becomes smaller and is in a negative direction;

determining whether a predetermined first condition requiring that the speed is in the negative direction and that an absolute value of the speed is equal to or greater than a predetermined first speed threshold value is satisfied, and determining whether a predetermined second condition requiring that a second calculated speed is in a positive direction is satisfied; and when the predetermined first condition related to a first change in the first coordinate in the first direction is satisfied at a first point of time and then the predetermined second condition related to a second change in the first coordinate in the first direction is satisfied at a second point of time, executing a process in electronic equipment that is a target of control, based on the second coordinate in the second direction and the third coordinate in the third direction at one or more points of time between the first point of time and the second point of time, wherein the executing of the process in the electronic equipment includes executing the process in the electronic equipment based on the second coordinate in the second direction and the third coordinate in the third direction at the one or more points of time between the first point of time and the second point of time when the predetermined first condition is satisfied at the first point of time and then the predetermined second condition is satisfied at the second point of time.

11. A control apparatus, comprising:

a memory in which a program is stored; and a processor coupled to the memory and configured to perform processing by executing the program, the processing including:

receiving time series spatial coordinates of an object to be detected, the time series spatial coordinates including a first coordinate in a first direction, a second coordinate in a second direction intersecting the first direction, and a third coordinate in a third direction intersecting the first direction and the second direction;

calculating a speed of the object to be detected in the first direction, based on the time series spatial coordinates, the speed being calculated when the first coordinate of the object to be detected in the first direction becomes smaller and is in a negative direction;

determining whether a predetermined first condition requiring that the speed is in the negative direction and that an absolute value of the speed is equal to or greater than a predetermined first speed threshold value is satisfied, and determining whether a predetermined second condition requiring that an absolute value of the speed is equal to or less than a predetermined second speed threshold value is satisfied; and when the predetermined first condition related to a first change in the first coordinate in the first direction is satisfied at a first point of time and then the predetermined second condition related to a second change in the first coordinate in the first direction is satisfied at a second point of time, executing a process in electronic equipment that is a target of control, based on the second coordinate in the second direction and the third coordinate in the third direction at one or more points of time between the first point of time and the second point of time, wherein the executing of the process in the electronic equipment includes executing the process in the electronic equipment based on the second coordinate in the second direction and the third coordinate in the third direction at the one or more points of time between the first point of time and the second point of time when the predetermined first condition is satisfied at the first point of time and then the predetermined second condition is satisfied at the second point of time.

12. The control apparatus according to claim 11, wherein the electronic equipment is a display, and wherein the first direction is a normal direction of a display surface of the display.

13. The control apparatus according to claim 11, wherein the processing further includes:

periodically calculating a first movement amount that is an amount of movement of the object to be detected in the second direction per a predetermined period of time, based on the time series spatial coordinates; and determining whether a third condition requiring that the first movement amount is equal to or less than a predetermined first movement amount threshold value is satisfied, and wherein the executing of the process in the electronic equipment includes executing the process in the electronic equipment based on the second coordinate in the second direction and the third coordinate in the third direction at the one or more points of time between the first point of time and the second point of time when the predetermined first condition and the third condition are satisfied at the first point of time and then the predetermined second condition is satisfied at the second point of time.

14. The control apparatus according to claim 13, wherein the processing further includes:

periodically calculating a second movement amount that is a second amount of movement of the object to be detected in the third direction per a second predetermined period of time, based on the time series spatial coordinates; and determining whether a fourth condition requiring that the second movement amount is equal to or less than a predetermined second movement amount threshold value is satisfied, and wherein the executing of the process in the electronic equipment includes executing the process in the electronic equipment based on the second coordinate in the second direction and the third coordinate in the third direction at the one or more points of time between the first point of time and the second point of time when the predetermined first condition, the third condition, and the fourth condition are satisfied at the first point of time and then the predetermined second condition is satisfied at the second point of time.

15. The control apparatus according to claim 11, wherein the processing further includes:

calculating a first average coordinate derived from averaging coordinates in the second direction and a second average coordinate derived from averaging coordinates in the third direction in a predetermined period between the first point of time and the second point of time, based on the time series spatial coordinates, and wherein the executing of the process in the electronic equipment includes executing the process in the electronic equipment based on the first average coordinate and the second average coordinate when the predetermined first condition is satisfied at the first point of time and then the predetermined second condition is satisfied at the second point of time.

16. The control apparatus according to claim 11, wherein the processing further includes:

calculating a total movement amount that is a sum of amounts of movement of the object to be detected in the first direction from the first point of time to the second point of time, based on the time series spatial coordinates; and determining whether a movement amount condition requiring that the total movement amount is equal to or greater than a predetermined total movement amount threshold value is satisfied, and wherein the executing of the process in the electronic equipment includes executing the process in the electronic equipment based on the coordinate in the second direction and the coordinate in the third direction at one or more points of time between the first point of time and the second point of time when the predetermined first condition is satisfied at the first point of time, the predetermined second condition is satisfied at the second point of time, and the movement amount condition is satisfied.

17. The control apparatus according to claim 11, wherein the predetermined second speed threshold value is smaller than the first speed threshold value.

18. The control apparatus according to claim 11, wherein the predetermined second condition requires that the speed is in the negative direction and that the absolute value of the speed is equal to or less than the predetermined second speed threshold value.

* * * * *